US009896343B2

(12) United States Patent
Xia et al.

(10) Patent No.: US 9,896,343 B2

(45) Date of Patent: Feb. 20, 2018

(54) TITANIUM SILICALITE MOLECULAR SIEVE AND ITS SYNTHESIS

(71) Applicants: CHINA PETROLEUM & CHEMICAL CORPORATION, Beijing (CN); RESEARCH INSTITUTE OF PETROLEUM PROCESSING, SINOPEC, Beijing (CN)

(72) Inventors: Changjiu Xia, Beijing (CN); Bin Zhu, Beijing (CN); Min Lin, Beijing (CN); Xinxin Peng, Beijing (CN); Xingtian Shu, Beijing (CN); Chunfeng Shi, Beijing (CN)

(73) Assignees: CHINA PETROLEUM & CHEMICAL CORPORATION, Beijing (CN); RESEARCH INSTITUTE OF PETROLEUM PROCESSING, SINOPEC, Beijing (CN)

( * ) Notice: Subject to any disclaimer, the term of this patent is extended or adjusted under 35 U.S.C. 154(b) by 570 days.

(21) Appl. No.: 14/527,657

(22) Filed: Oct. 29, 2014

(65) Prior Publication Data

US 2015/0118149 A1 Apr. 30, 2015

(30) Foreign Application Priority Data

Oct. 29, 2013 (CN) .......................... 2013 1 0523080
Oct. 29, 2013 (CN) .......................... 2013 1 0523207
Oct. 29, 2013 (CN) .......................... 2013 1 0523211

(51) Int. Cl.
*C01B 39/08* (2006.01)
*C01B 39/00* (2006.01)

(52) U.S. Cl.
CPC ............ *C01B 39/00* (2013.01); *C01B 39/085* (2013.01); *C01P 2004/90* (2013.01); *C01P 2006/17* (2013.01)

(58) Field of Classification Search
CPC . C01B 39/085; C01P 2006/17; C01P 2004/90
See application file for complete search history.

(56) References Cited

U.S. PATENT DOCUMENTS 4,073,865 A 2/1978 Flanigen et al.
4,410,501 A 10/1983 Taramasso et al.
6,814,950 B1 * 11/2004 Shan ...................... B01J 29/005 423/326
7,922,995 B2 * 4/2011 Vermeiren ............ C01B 37/005 423/122
2012/0016161 A1 1/2012 Tsujiuchi
2012/0209029 A1 8/2012 Chao et al.
2013/0041181 A1 2/2013 Chen et al.

FOREIGN PATENT DOCUMENTS

CN 1260241 A 7/2000
CN 1057976 C 11/2000
CN 1102442 C 3/2003
CN 102120589 A 7/2011
CN 101798088 B 8/2011
CN 102502687 A 6/2012

* cited by examiner

*Primary Examiner* — David M Brunsman

(74) *Attorney, Agent, or Firm* — Novick, Kim & Lee, PLLC; Allen Xue

(57) ABSTRACT

The present invention relates to a titanium silicalite molecular sieve, wherein the crystal grain of the titanium silicalite molecular sieve has a ratio of (surface Si/Ti ratio):(bulk Si/Ti ratio) being larger than 1.1 and less than 5.

35 Claims, 12 Drawing Sheets

TITANIUM SILICALITE MOLECULAR SIEVE AND ITS SYNTHESIS

TECHNICAL FIELD

The present invention relates to a titanium silicalite molecular sieve and its synthesis.

BACKGROUND

The titanium silicalite (sometimes called as Ti—Si) molecular sieve is a new heteroatom-containing molecular sieve developed in 1980s. The TS-1 with MFI structure, TS-2 with MEL structure, MCM-22 with MWW structure, and TS-48 having larger pores have been synthesized.

In the currently known direct hydrothermal synthesis of the Ti—Si molecular sieve, the organic silicon source and/or the inorganic silicon source are generally used.

The organic silicon source such as the organic silicate TEOS is costly, and the molecular sieve made therefrom has a lower content of effective component. It is difficult to increase the solid content in the crystallization product in the synthesis of the molecular sieve. In addition, in the production of the molecular sieve, a large amount of ethanol is evaporated. It is difficult to collect and reuse the evaporated ethanol. In order to reduce the cost, the inorganic silicon source is used to partly or completely substitute the organic silicon source. However, the Ti—Si molecular sieve made from the inorganic silicon source has a lower activity. In addition, the Ti—Si molecular sieve obtained by using the organic quaternary ammonium salt as the template agent has a lower activity. Furthermore, the Ti—Si molecular sieve obtained by the known method has a higher micropore volume and a lower mesopore volume.

Prior Art 1: U.S. Pat. No. 4,410,501

Prior Art 2: CN 1260241A

SUMMARY OF THE INVENTION

Aim to the problem of the titanium silicalite molecular sieve in the art, the present invention is to provide a new titanium silicalite molecular sieve, and its synthesis process.

The present invention provides a process for synthesizing a titanium silicalite molecular sieve, comprises the following steps of:

(1) a titanium source, a template agent, an organic silicon source, water and an optional inorganic amine source are mixed and subjected to hydrolyzation and removing alcohols;

(2) the product obtained in the step (1) is aged at 15-50° C.;

(3) the aged product obtained in the step (2) and a solid silicon source are mixed homogeneously, then subjected to crystallization in a close reaction vessel, and the titanium silicalite molecular sieve is collected.

preferably, the procedure of hydrolysis and removing alcohols in the step (1) is conducted by stirring the resulting mixture at 0° C. to 150° C., or 0-100° C. for at least 10 minutes, for example, 10 minutes to 50 hours, wherein the molar ratio of the inorganic amine source to the titanium source can be (0-5):1; and/or preferably, the aging in the step (2) is conducted by keeping the product by standing at room temperature to 50° C. for 1 hour to 60 hours, or 2 hours to 50 hours, or 3 hours to 30 hours, or 3 hours to 15 hours; and/or preferably, in the step (3), the weight ratio of the aged product to the solid silicon source can be 1:0.1-10; the molar ratio of the titanium source to the total silicon source can be (0.005-0.05):1; the molar ratio of water to the total silicon source can be (5-100):1; the molar ratio of the template agent to the total silicon source can be: not less than 0.05:1, e.g. (0.05-0.5):1, or (0.05-0.3):1.

The present invention provides a process for synthesizing a titanium silicalite molecular sieve, comprises the following steps of:

(1) a titanium source, a template agent, an organic silicon source, water and an optional inorganic amine source are mixed and subjected to hydrolyzation and removing alcohols;

(2) the product obtained in the step (1) is aged at 15-50° C.;

(3) the aged product obtained in the step (2) and a solid silicon source are mixed homogeneously, then subjected to crystallization in a close reaction vessel, and the titanium silicalite molecular sieve is collected;

wherein the template agent is an organic quaternary ammonium salt and an organic base.

preferably, the procedure of hydrolysis and removing alcohols in the step (1) is conducted by stirring the resulting mixture at 0° C. to 150° C., or 0-100° C. for at least 10 minutes, for example, 10 minutes to 50 hours, wherein the molar ratio of the inorganic amine source to the titanium source can be (0-5):1; and/or preferably, the aging in the step (2) is conducted by keeping the product by standing at room temperature to 50° C. for 1 hour to 60 hours, or 2 hours to 50 hours, or 3 hours to 30 hours, or 3 hours to 15 hours; and/or preferably, in the step (3), the weight ratio of the aged product to the solid silicon source can be 1:0.1-10; the molar ratio of the titanium source to the total silicon source can be (0.005-0.05):1; the molar ratio of water to the total silicon source can be (5-100):1; the molar ratio of the template agent to the total silicon source can be: not less than 0.08:1, e.g. (0.08-0.6):1, or (0.1-0.3):1.

The present invention provides a process for synthesizing a Ti—Si micropore and mesopore molecular sieve composite, which comprises the following steps of:

(1) a titanium source, a template agent, an organic silicon source, water and an optional inorganic amine source are mixed and subjected to hydrolyzation and removing alcohols;

(2) the product obtained in the step (1) is aged at 15-50° C.;

(3) the aged product obtained in the step (2) and a solid silicon source are mixed homogeneously, then subjected to crystallization in a close reaction vessel, and the Ti—Si micropore and mesopore molecular sieve composite is collected;

wherein the template agent comprises an organic quaternary ammonium compound and a long-chain alkyl ammonium compound and optionally an organic amine.

preferably, the procedure of hydrolysis and removing alcohols in the step (1) is conducted by stirring the resulting mixture at 0° C. to 150° C., or 0-100° C., or 50-95° C. for at least 10 minutes, for example, 10 minutes to 50 hours, wherein the molar ratio of the inorganic amine source to the titanium source can (0-5):1; and/or preferably, the aging in the step (2) is conducted by keeping the product by standing at room temperature to 50° C. for 1 hour to 60 hours, or 2 hours to 50 hours, or 3 hours to 30 hours, or 3 hours to 15 hours; and/or preferably, in the step (3), the weight ratio of the aged product to the solid silicon source can be 1:0.1-10; and/or the molar ratio of the titanium source:the total silicon source can be (0.005-0.05):1, or (0.01-0.05):1; the molar ratio of water to the total silicon source can (5-100):1; the molar ratio of the template agent to the total silicon source can be: not less than 0.08:1, e.g. (0.08-0.6):1, or (0.1-0.3):1; and/or the template agent is an organic quaternary ammonium compound, a long-chain alkyl ammonium compound and optionally an organic amine, wherein the molar ratio of the organic quaternary ammonium compound to the total silicon source can be (0.04-0.45):1, the molar ratio of the long-chain alkyl ammonium compound to the total silicon source can be (0.04-0.45):1, the molar ratio of the organic amine to the total silicon source can be (0-0.40):1.

The present invention further provides a titanium silicalite molecular sieve, which is characterized in that: the crystal grain of the titanium silicalite molecular sieve is rich of silicon on the surface, the crystal grain has a ratio of (surface Si/Ti molar ratio) to (bulk Si/Ti molar ratio) being larger than 1.1, e.g. 1.1-5. The ratio of (surface Si/Ti ratio):(bulk Si/Ti ratio) is for example 1.2-4:1.

The surface Si/Ti ratio of the crystal grain of the titanium silicalite molecular sieve can be obtained by measuring the Si/Ti ratio of the atom layer being 5 nm or less away from the crystal grain's surface with XPS or TEM-EDX.

The bulk Si/Ti ratio of the crystal grain of the titanium silicalite molecular sieve can be obtained by measuring a zone being 20 nm or more away from the crystal grain's surface with chemical analysis, XPS, XRF or TEM-EDX.

The ratio of (surface Si/Ti ratio):(bulk Si/Ti ratio) is an average of the measurement from at least 15 particles.

The present invention further provides a Ti—Si micropore and mesopore complex molecular sieve, wherein the Ti—Si micropore and mesopore complex molecular sieve has not only a micropore structure, but also a mesopore structure. The pore diameter of said micropore is less than 1 nm, while the pore diameter of said mesopore is 2-8 nm There are diffraction peaks at 2θ angles of 0-3° and 5-35° in the XRD spectrum of the Ti—Si micropore and mesopore complex molecular sieve. The diffraction peak at 2θ angle of 5-35° in the XRD spectrum of the molecular sieve demonstrates the presence of the micropore structure in the molecular sieve, and the diffraction peak at 2θ angle of 0-3° in the XRD spectrum of the molecular sieve demonstrates the presence of the mesopore structure in the molecular sieve. According to the Ti—Si micropore and mesopore complex molecular sieve, the micropore volume is 0.12-0.19 mL/g, and the mesopore volume is 0.3-0.8 mL/g. According to the present invention, the micropore volume means the volume of pores having a pore diameter being less than 1 nm; the mesopore volume means the volume of pores having a pore diameter of 2-8 nm.

The present invention further provides a process for producing caprolactam by rearranging cyclohexanone oxime, comprising the step of contacting cyclohexanone oxime with a titanium silicalite molecular sieve, wherein the titanium silicalite molecular sieve is the titanium silicalite molecular sieve according to the present invention.

Specifically, the present invention provides the following technical solutions:

1. A titanium silicalite molecular sieve, wherein the crystal grain of the titanium silicalite molecular sieve has a ratio of (surface Si/Ti ratio):(bulk Si/Ti ratio) being larger than 1.1 and less than 5.

2. The titanium silicalite molecular sieve according to any one of technical solutions 1-7 expect for this technical solution, wherein the ratio of (surface Si/Ti ratio):(bulk Si/Ti ratio) is (1.2-4):1.

3. The titanium silicalite molecular sieve according to any one of technical solutions 1-7 expect for this technical solution, wherein the titanium silicalite molecular sieve has a Ti/Si molar ratio of (0.005-0.03):1, preferably (0.01-0.025):1.

4. The titanium silicalite molecular sieve according to any one of technical solutions 1-7 expect for this technical solution, wherein the titanium silicalite molecular sieve is a TS-1 molecular sieve, a TS-2 molecular sieve or a Ti-β molecular sieve.

5. The titanium silicalite molecular sieve according to any one of technical solutions 1-7 expect for this technical solution, wherein the crystal grain of the titanium silicalite molecular sieve has a hollow structure, with a radial length of 5-300 nm for the cavity portion of the hollow grain, the adsorption capacity of benzene measured for the molecular sieve sample under the conditions of 25° C., P/P0=0.10 and 1 hour of adsorption time is at least 70 mg/g, and there is a hysteresis loop between the adsorption isotherm and the desorption isotherm for nitrogen adsorption by the molecular sieve at a low temperature.

6. The titanium silicalite molecular sieve according to any one of technical solutions 1-7 expect for this technical solution, wherein the titanium silicalite molecular sieve has a micropore structure with a pore diameter being less than 1 nm and a mesopore structure with a pore diameter of 2-8 nm, the volume of pores having a pore diameter of 2-8 nm is 0.3-0.8 mL/g, the volume of pores having a pore diameter being less than 1 nm is 0.12-0.19 mL/g.

7. The titanium silicalite molecular sieve according to any one of technical solutions 1-7 expect for this technical solution, wherein within the 10 nm depth from the surface of the titanium silicalite molecular sieve to the interior of the titanium silicalite molecular sieve, in a direction from the surface to the interior, the Si/Ti ratio by atom decreases gradually "in a pattern of a quadratic function curve with a downward opening".

8. A process for synthesizing a titanium silicalite molecular sieve, comprising the following steps of:

(1) a titanium source, a template agent, an organic silicon source, water and an optional inorganic amine source are mixed and subjected to hydrolyzation and removing alcohols;

(2) the product obtained in the step (1) is aged at 15-50° C.;

(3) the aged product obtained in the step (2) and a solid silicon source are mixed homogeneously, then subjected to crystallization in a close reaction vessel, and the titanium silicalite molecular sieve is collected.

9. The process according to any one of technical solutions 8-40 expect for this technical solution, wherein the titanium source is an organic titanium source and/or an inorganic titanium source;

the template agent can be one or more of an organic quaternary ammonium base, an organic amine, an organic quaternary ammonium salt, and an long-chain alkyl ammonium compound, wherein the molar ratio of the organic quaternary ammonium base to the total silicon source is zero or (0.05-0.36):1; the molar ratio of the organic amine to the total silicon source is (0-0.45):1; the molar ratio of the organic quaternary ammonium salt to the total silicon source is (0-0.45):1; and the molar ratio of the long-chain alkyl ammonium compound to the total silicon source is zero or (0.04-0.45):1; preferably and optionally, when the content of the organic quaternary ammonium base is zero, neither the content of the organic amine nor the content of the organic quaternary ammonium salt are zero;

the organic silicon source is an organic silicate, which has a general formula of $Si(OR^1)_4$, $R^1$ is a linear or branched $C_1$-$C_6$ alkyl;

the solid silicon source is a high purity silica particle or powder, on a dry basis and by weight, the solid silicon source has a $SiO_2$ content of more than 99.99 wt %, and a total content by atom of Fe, Al and Na of less than 10 ppm; the inorganic amine source is an inorganic ammonium salt and/or aqueous ammonia.

10. The process according to any one of technical solutions 8-40 expect for this technical solution, wherein the molar ratio of the titanium source (as TiO2) to the total silicon source (as $SiO_2$) is (0.005-0.05):1;

the molar ratio of the template agent to the total silicon source (as $SiO_2$) is (0.05-0.6):1;

the molar ratio of water to the total silicon source (as $SiO_2$) is (5-100):1;

the molar ratio of the inorganic amine source (as NH4+) to the titanium source (as TiO2) is (0-5):1;

the weight ratio of the aged product (as $SiO_2$):the solid silicon source (as $SiO_2$) is 1:(0.1-10).

11. The process according to any one of technical solutions 8-40 expect for this technical solution, wherein the aging in the step (2) is conducted by keeping the product by standing at 15-50° C. for 1-60 hours.

12. The process according to any one of technical solutions 8-40 expect for this technical solution, wherein in the step (3), the crystallization temperature is 110° C. to 200° C.; the crystallization pressure is an autogenous pressure; the crystallization time is 2 hours to 20 days.

13. The process according to any one of technical solutions 8-40 expect for this technical solution, wherein in the step (1), the template agent comprises an organic quaternary ammonium base and/or an organic amine, and optionally an organic quaternary ammonium salt.

14. The process according to any one of technical solutions 8-40 expect for this technical solution, wherein in the step (1), wherein in the step (1), the template agent comprises an organic quaternary ammonium base and/or an organic amine, and optionally an organic quaternary ammonium salt, wherein the molar ratio of the organic quaternary ammonium base to the organic amine is 1:(0-10), and the molar ratio of the organic quaternary ammonium base to the organic quaternary ammonium salt is 1:(0-10).

15. The process according to any one of technical solutions 8-40 expect for this technical solution, wherein in the step (1), the template agent comprises an organic quaternary ammonium salt and an organic base.

16. The process according to any one of technical solutions 8-40 expect for this technical solution, wherein in the step (1), the template agent comprises an organic quaternary ammonium salt and an organic base, wherein the molar ratio of the organic quaternary ammonium salt to the total silicon source is (0.04-0.55):1, the molar ratio of the organic quaternary ammonium base to the organic quaternary ammonium salt is (0.04-0.45):1, and the molar ratio of the inorganic amine source (as NH4+) to the titanium source (as TiO2) is (0-0.5):1.

17. The process according to any one of technical solutions 8-40 expect for this technical solution, wherein in the step (1), the template agent comprises an organic quaternary ammonium base and/or an organic quaternary ammonium salt, an optional organic amine, and a long-chain alkyl ammonium compound.

18. The process according to any one of technical solutions 8-40 expect for this technical solution, wherein in the step (1), the template agent comprises an organic quaternary ammonium base and/or an organic quaternary ammonium salt, an optional organic amine, and a long-chain alkyl ammonium compound, wherein the molar ratio of (the organic quaternary ammonium base and the organic quaternary ammonium salt) to the total silicon source is (0.04-0.45):1, and the molar ratio of the long-chain alkyl ammonium compound and the total silicon source is (0.04-0.45):1.

19. The process according to any one of technical solutions 8-40 expect for this technical solution, wherein the template agent is selected from the group consisting of:

(1) an organic quaternary ammonium base and optionally a long-chain alkyl ammonium compound;

(2) an organic quaternary ammonium salt, an organic amine and optionally a long-chain alkyl ammonium compound;

(3) an organic quaternary ammonium salt and a long-chain alkyl ammonium compound.

20. The process according to any one of technical solutions 8-40 expect for this technical solution, wherein the titanium silicalite molecular sieve is a TS-1 molecular sieve, wherein the template agent is one or more of tetrapropylammonium hydroxide, tetrapropylammonium chloride and tetrapropylammonium bromide, and optionally an organic amine and/or a long-chain alkyl ammonium compound; or, the titanium silicalite molecular sieve is a TS-2 molecular sieve, wherein the template agent is one or more of tetrabutylammonium hydroxide, tetrabutylammonium chloride and tetrabutylammonium bromide, and optionally an organic amine and/or a long-chain alkyl ammonium compound; or, the titanium silicalite molecular sieve is a Ti-β molecular sieve, wherein the template agent is one or more of tetraethylammonium hydroxide, tetraethylammonium chloride and tetraethylammonium bromide, and optionally an organic amine and/or a long-chain alkyl ammonium compound.

21. The process according to any one of technical solutions 8-40 expect for this technical solution, wherein said process further comprises a step (4): the titanium silicalite molecular sieve obtained in the step (3) is subjected to crystallization in an organic base solution, and then the titanium silicalite molecular sieve is collected, the crystallization temperature can be 100° C. to 200° C., or 100° C. to 150° C., or 120° C. to 200° C., or 150° C. to 200° C., the crystallization time can be 0.1 day to 10 days, or 0.5 day to 10 days, or 0.5 day to 8 days, or 0.5 day to 6 days, or 1 day to 6 days.

in the step (4), the molar ratio of the titanium silicalite molecular sieve to the organic base can be 1:(0.02-0.5), or 1:(0.02-0.2), the molar ratio of the titanium silicalite molecular sieve to water can be 1:(2-50), 1:(2-30), 1:(2-20), or 1:(5-10).

22. The process according to any one of technical solutions 8-40 expect for this technical solution, wherein the titanium source is one or more of tetraalkyl titanate (Ti(alkoxy)4), TiCl4, Ti(SO4)2 and hydrolysates thereof, wherein the alkyl group in tetraalkyl titanate contains 1-6 carbon atoms.

23. The process according to any one of technical solutions 8-40 expect for this technical solution, wherein the solid silicon source is carbon white having a specific surface area of 50-400 m2/g.

24. The process according to any one of technical solutions 8-40 expect for this technical solution, wherein the molar ratio of the titanium source (as TiO2) to the total silicon source (as $SiO_2$)=(0.005-0.040):1; (0.010-0.030):1; or (0.010-0.025):1.

25. The process according to any one of technical solutions 8-40 expect for this technical solution, wherein the molar ratio of the template agent to the total silicon source (as $SiO_2$)=(0.05-0.30):1; (0.05-0.25):1; 0.05-0.20):1; (0.05-0.5):1; or (0.08-0.6):1;

26. The process according to any one of technical solutions 8-40 expect for this technical solution, wherein the molar ratio of water to the total silicon source (as $SiO_2$) is (5-50):1; (6-30):1; or (6-15):1.

27. The process according to any one of technical solutions 8-40 expect for this technical solution, wherein the molar ratio of the inorganic amine source (as NH4+) to the titanium source (as TiO2) is (0.01-4):1 or (0.05-0.5):1.

28. The process according to any one of technical solutions 8-40 expect for this technical solution, wherein the molar ratio of the inorganic amine source (as NH4+) to the total silicon source (as $SiO_2$) is (0.01-0.07):1 or (0.01-0.05):1.

29. The process according to any one of technical solutions 8-40 expect for this technical solution, wherein the weight ratio of the aged product (as $SiO_2$) to the solid silicon source (as $SiO_2$) is 1: (1-9) or 1: (2-8).

30. The process according to any one of technical solutions 8-40 expect for this technical solution, wherein the organic quaternary ammonium base can be one or more of tetrapropylammonium hydroxide (TPAOH), tetrabutylammonium hydroxide (TBAOH) and tetraethylammonium hydroxide (TEAOH);

the organic amine can be one or more of aliphatic amine, aromatic amine and alcoholic amine;

the aliphatic amine can have a general formula of $R^3(NH_2)_n$, wherein $R^3$ is $C_{1-4}$alkyl or $C_{1-4}$alkylene, n is 1 or 2; for example, one or more of ethylamine, n-butylamine, butylene diamine and hexamethylene diamine;

the alcoholic amine can have a general formula of $(HOR^4)_m NH_{(3-m)}$, wherein $R^4$ is $C_1$-$C_4$alkyl, m is 1, 2 or 3; for example, one or more of monoethanolamine, diethanolamine and triethanolamine;

the aromatic amine can be one or more of aniline, amino toluene and α-phenylene diamine.

the organic quaternary ammonium salt can be one or more of tetrapropylammonium bromide, tetrabutylammonium bromide, tetraethylammonium bromide, tetrapropylammonium chloride, tetrabutylammonium chloride and tetraethylammonium chloride.

the long-chain alkyl ammonium compound can have a formula of $R^5NH_3X$ or $R^5N(R^6)_3X$, wherein $R^5$ is $C_12$-$C_18$ alkyl, $R^6$ is $C_1$-$C_6$alkyl (e.g. $C_1$-$C_4$alkyl), wherein three $R^6$s in $R^5N(R^6)_3X$ can be identical or not; X is a monovalent anion, e.g. $OH^-$, $Cl^-$, $Br^-$; for example, one or more of long-chain alkyl trimethyl ammonium chloride, long-chain alkyl trimethyl ammonium bromide, and long-chain alkyl trimethyl ammonium hydroxide; for example, cetyltrimethylammonium bromide (CTMAB), cetyltrimethylammonium chloride, cetyltrimethylammonium hydroxide (MSDS), the long-chain alkyl ammonium compound is one or more of myristyltrimethylammonium bromide (TTAB), myristyltrimethylammonium chloride, myristyltrimethylammonium hydroxide, dodecyltrimethylammonium bromide (DTAB), dodecyltrimethylammonium chloride, dodecyltrimethylammonium hydroxide, octadecyltrimethylammonium bromide, octadecyltrimethylammonium chloride, octadecyltrimethylammonium hydroxide.

31. The process according to any one of technical solutions 8-40 expect for this technical solution, wherein in the step (1), the time for hydrolyzation and removing alcohols is at least 10 minutes, e.g. 2-30 hours.

32. The process according to any one of technical solutions 8-40 expect for this technical solution, wherein in the step (1), the temperature for hydrolyzation and removing alcohols is 0° C. to 150° C., e.g. 50-95° C.

33. The process according to any one of technical solutions 8-40 expect for this technical solution, wherein in the mixture obtained in the step (1), the weight content of alcohols produced by hydrolyzation of the organic silicon source and the titanium source is not higher than 10 ppm.

34. The process according to any one of technical solutions 8-40 expect for this technical solution, wherein in the step (2), the aging time is 2 hours to 50 hours, or 3 hours to 30 hours, or 3 hours to 15 hours, or 1 hour to 60 hours.

35. The process according to any one of technical solutions 8-40 expect for this technical solution, wherein in the step (2), the aging temperature is room temperature to 50° C., or 15° C. to 30° C., or 15° C. to 26° C., or 26° C. to 30° C.

36. The process according to any one of technical solutions 8-40 expect for this technical solution, wherein in the step (3), the crystallization temperature is 110° C. to 200° C., 140° C. to 180° C., or 160° C. to 180° C.

37. The process according to any one of technical solutions 8-40 expect for this technical solution, wherein in the step (3), the crystallization time is 2 hours to 20 days, 0.5 day to 20 days, 0.5 day to 10 days, or 1 day to 6 days, or 0.5 day to 6 days, or 0.5 day to 3 days, or 1 day to 3 days.

38. The process according to any one of technical solutions 8-40 expect for this technical solution, wherein In the step (3), the crystallization pressure is an autogenous pressure.

39. The process according to any one of technical solutions 8-40 expect for this technical solution, wherein in the step (3), the crystallization is conducted under the following conditions: the crystallization is performed at 100° C. to 130° C., e.g. at 110° C. to 130° C. for 0.5 day to 1.5 days, and then at 160° C. to 180° C. for 1 day to 3 days, and the crystallization pressure is an autogenous pressure.

40. The process according to any one of technical solutions 8-40 expect for this technical solution, wherein the organic silicate is one or more of tetramethyl orthosilicate, tetraethyl orthosilicate, tetrabutyl orthosilicate and dimethyl diethyl orthosilicate.

ILLUSTRATION OF DRAWINGS

DETAILED DESCRIPTION

Figure 1:
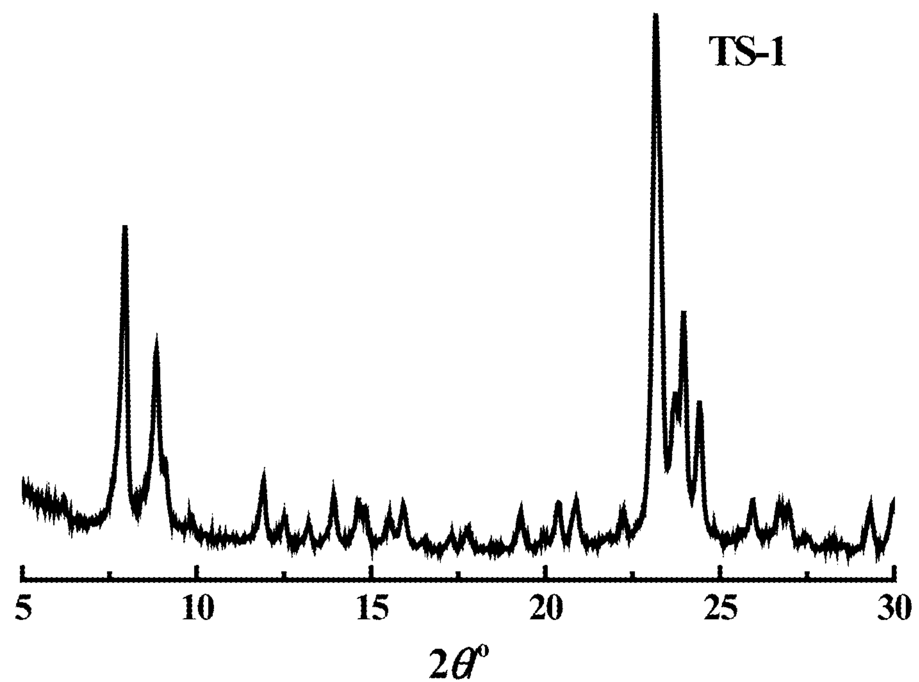
FIG. 1 is a XRD spectrum of the MFI-structured TS-1 molecular sieve.

According to the present invention, when a ratio involves the total silicon source, the organic silicon source, the solid silicon source (also called the inorganic silicon source), and the aged product, the ratio is calculated as $SiO_2$, unless indicated to the contrary; when a ratio involves the inorganic amine source, the inorganic ammonium salt and the aqueous ammonia, the ratio is calculated as NH4+, unless indicated to the contrary; when a ratio involves water, said ratio is calculated as $H_2O$, unless indicated to the contrary; when a ratio involves titanium source, said ratio is calculated as TiO2, unless indicated to the contrary.

The titanium silicalite molecular sieve of the present invention has a higher ratio of (surface Si/Ti ratio) to (bulk Si/Ti ratio) and has a higher oxidation activity. When it is used in an oxidation reaction in which H2O2 is involved, the decomposing effect of Ti in the surface layer on H2O2 can be reduced, which is favorable for reducing the activity of the side reaction in which H2O2 is decomposed ineffectively, and increasing the utilization rate of the starting material.

Furthermore, in the process for synthesizing the titanium silicalite molecular sieve according to the present invention, the cheap and readily available solid silicon source such as high purity silica gel and/or carbon white can be used to partly or completely substitute the costly organic silicon source, and/or the organic quaternary ammonium salt is used to substitute the organic quaternary ammonium base, the waste emission in the production of the molecular sieve can be lowered and the cost of raw materials can be reduced.

In the process for synthesizing the titanium silicalite molecular sieve according to the present invention, the organic quaternary ammonium salt, rather than the organic quaternary ammonium base, can be used as the template agent to produce the titanium silicalite molecular sieve. The obtained molecular sieve has a smaller crystal grain size and a higher activity than those prepared according to the prior art by using the organic quaternary ammonium salt.

In the process for synthesizing the titanium silicalite molecular sieve according to the present invention, the titanium silicalite molecular sieve can be produced at a lower used amount of the template agent and at a lower ratio of water to the total silicon source. The cost for synthesizing the titanium silicalite molecular sieve can be sharply reduced, the solid content in the crystallization product in the synthesis of the molecular sieve can be increased, and the single-vessel molecular sieve output can be increased.

The present invention further provides a process for producing caprolactam by rearranging cyclohexanone oxime, comprising the step of contacting cyclohexanone oxime with a titanium silicalite molecular sieve, wherein the titanium silicalite molecular sieve is the titanium silicalite molecular sieve according to the present invention.

In the process for synthesizing the titanium silicalite molecular sieve according to the present invention, the titanium silicalite molecular sieve can be synthesized at a lower used amount of the template agent. For example, the molar ratio of the template agent to the total silicon source can be (0.05-0.3):1, e.g. (0.05-0.25):1, or (0.1-0.3):1, or (0.1-0.25):1, or (0.05-0.2):1.

In the process for synthesizing the titanium silicalite molecular sieve according to the present invention, the titanium silicalite molecular sieve can be synthesized at a higher solid content, so that the used amount of water can be reduced, and the single-vessel output can be increased (i.e. under the same reactor volume, more molecular sieve can be produced in a single synthesis). Therefore, the molar ratio of water to the total silicon source can be lower, e.g. (5-80):1, or (5-50):1, or (6-30):1, or (6-20):1, or (5-30):1, or (6-15):1.

Material

In a process for synthesizing the titanium silicalite molecular sieve, the used material comprises a titanium source, a template agent, a total silicon source, an inorganic amine source and water. The total silicon source refers to a combination of an organic silicon source and an inorganic silicon source, the inorganic silicon source is also called as the solid silicon source.

In an embodiment, the molar ratio of the titanium source to the total silicon source can be (0.01-0.05):1.

In an embodiment, the molar ratio of the titanium source to the total silicon source can be (0.005-0.05):1.

In an embodiment, the molar ratio of the titanium source to the total silicon source can be (0.01-0.03):1.

In an embodiment, the molar ratio of the titanium source to the total silicon source can be (0.01-0.025):1.

In an embodiment, the molar ratio of the template agent to the total silicon source can be not less than 0.05:1.

In an embodiment, the molar ratio of the template agent to the total silicon source can be not less than 0.08:1.

In an embodiment, the molar ratio of the template agent to the total silicon source can be (0.05-0.30):1.

In an embodiment, the molar ratio of the template agent to the total silicon source can be (0.05-0.20):1.

In an embodiment, the molar ratio of the template agent to the total silicon source can be (0.08-0.60):1.

In an embodiment, the molar ratio of the template agent to the total silicon source can be (0.05-0.20):1.

In an embodiment, the molar ratio of the template agent to the total silicon source can be (0.10-0.25):1.

In an embodiment, the molar ratio of the template agent to the total silicon source can be (0.10-0.20):1.

In an embodiment, the molar ratio of the template agent to the total silicon source can be (0.10-0.30):1.

In an embodiment, the molar ratio of the inorganic amine source to the total silicon source can be (0.01-0.07):1.

In an embodiment, the molar ratio of the inorganic amine source to the total silicon source can be (0.01-0.05):1.

In an embodiment, the molar ratio of water to the total silicon source can be (6-20):1.

In an embodiment, the molar ratio of the inorganic amine source to the titanium source can be (0-5):1

In an embodiment, the molar ratio of the inorganic amine source to the titanium source can be (0.01-4):1

In an embodiment, the molar ratio of the inorganic amine source to the titanium source can be (0.01-0.5):1.

In an embodiment, the molar ratio of the inorganic amine source to the titanium source can be (0.05-0.5):1.

The introduction of the inorganic amine source can increase the oxidation activity of the synthesized molecular sieve, can increase the utilization rate of the titanium source (under the same used amount of the titanium source, a higher framework Ti/Si ratio can be obtained), and reduce the used amount of the titanium source.

Titanium Source

The titanium source is an organic titanium compound or an inorganic titanium compound, for example, one or more of tetraalkyl titanate ($Ti(alkoxy)_4$), $TiCl_4$, $Ti(SO_4)_2$ and hydrolysates thereof. The alkyl group in tetraalkyl titanate contains 1-6 carbon atoms, e.g. 1, 2, 3, 4, 5 or 6 carbon atoms.

In an embodiment, the molar ratio of the titanium source to the total silicon source can be (0.005-0.050):1.

In an embodiment, the molar ratio of the titanium source to the total silicon source can be (0.008-0.035):1.

In an embodiment, the molar ratio of the titanium source to the total silicon source can be (0.010-0.030):1.

In an embodiment, the molar ratio of the titanium source to the total silicon source can be (0.010-0.025):1.

In an embodiment, the molar ratio of the titanium source to the total silicon source can be (0.015-0.025):1.

Template Agent

The template agent can be an organic base, or can be an organic base and an organic quaternary ammonium salt. For example, the template agent can be an organic quaternary ammonium base, or can be a mixture of an organic quaternary ammonium base and an organic amine, or can be a mixture of an organic quaternary ammonium base and an organic quaternary ammonium salt, or can be a mixture of an organic amine and an organic quaternary ammonium salt, or can be a mixture of an organic quaternary ammonium base, an organic quaternary ammonium salt and an organic amine.

The template agent can also comprise a long-chain alkyl ammonium compound. For example, the template agent can comprise an organic quaternary ammonium compound, a long-chain alkyl ammonium compound and optionally an organic amine.

The organic base can be one or more of an organic quaternary ammonium base and an organic amine.

The organic amine can be one or more of aliphatic amine, aromatic amine and alcoholic amine.

The aliphatic amine can have a general formula of $R^3(NH_2)_n$, wherein $R^3$ is $C_{1-4}$alkyl or $C_{1-4}$alkylene, n is 1 or 2. The aliphatic amine can be one or more of ethylamine, n-butylamine, butylene diamine and hexamethylene diamine.

The alcoholic amine can have a general formula of $(HOR^4)_mNH_{(3-11)}$, wherein $R^4$ is $C_{1-4}$alkyl, m is 1, 2 or 3. The alcoholic amine can be one or more of monoethanolamine, diethanolamine and triethanolamine.

The aromatic amine refers to an amine having an aromatic substituent, and can be one or more of aniline, amino toluene and p-phenylene diamine.

The organic quaternary ammonium compound can have a general formula of $R^7_4NX^7$, wherein R7 is $C_1$, $C_2$, $C_3$, $C_4$, $C_5$ or $C_6$-alkyl, $X^7$ is a monovalent anion, e.g. OH—, Cl— or Br—. The organic quaternary ammonium compound is an organic quaternary ammonium base and/or an organic quaternary ammonium salt.

According to the present invention, the organic quaternary ammonium base can be one or more of tetrapropylammonium hydroxide (TPAOH), tetrabutylammonium hydroxide (TBAOH) and tetraethylammonium hydroxide (TEAOH).

According to the present invention, the organic quaternary ammonium salt can be one or more of tetrapropylammonium bromide, tetrabutylammonium bromide, tetraethylammonium bromide, tetrapropylammonium chloride, tetrabutylammonium chloride and tetraethylammonium chloride.

The long-chain alkyl ammonium compound can have a formula of $R^5NH_3X$ or $R^5N(R^6)_3X$, wherein $R^5$ is $C_{12}$-$C_{18}$ alkyl, $R^6$ is $C_1$-$C_6$alkyl (e.g. $C_1$-$C_4$alkyl), for example, methyl, ethyl, propyl, butyl, pentyl or hexyl, wherein three $R^6$s in $R^5N(R^6)_3X$ can be identical or not; X is a monovalent anion, e.g. $OH^-$, $Cl^-$, $Br^-$; when X is $OH^-$, it is called the alkaline long-chain alkyl ammonium compound in the present invention.

According to the present invention, the long-chain alkyl refers to $C_{12}$-$C_{18}$alkyl.

The long-chain alkyl ammonium compound for example is one or more of a long-chain alkyl trimethyl ammonium chloride, a long-chain alkyl trimethyl ammonium bromide, a long-chain alkyl trimethyl ammonium hydroxide. The long-chain alkyl ammonium compound for example is one or more of cetyltrimethylammonium bromide (CTMAB), cetyltrimethylammonium chloride, cetyltrimethylammonium hydroxide (MSDS), myristyltrimethylammonium bromide (TTAB), myristyltrimethylammonium chloride, myristyltrimethylammonium hydroxide, dodecyltrimethylammonium bromide (DTAB), dodecyltrimethylammonium chloride, dodecyltrimethylammonium hydroxide, octadecyltrimethylammonium bromide, octadecyltrimethylammonium chloride, and octadecyltrimethylammonium hydroxide.

In an embodiment, the template agent can comprise an organic quaternary ammonium base. For example, the template agent can be an organic quaternary ammonium base, or can be a mixture containing an organic quaternary ammonium base. For example, the template agent can be a mixture of an organic quaternary ammonium base and an organic amine, or can be a mixture of an organic quaternary ammonium base and an organic quaternary ammonium salt, or can be a mixture of an organic quaternary ammonium base, an organic quaternary ammonium salt and an organic amine.

In an embodiment, the molar ratio of the organic quaternary ammonium base to the total silicon source can be (0.05-0.36):1.

In an embodiment, the molar ratio of the organic quaternary ammonium base to the total silicon source can be (0.05-0.3):1.

In an embodiment, the molar ratio of the organic quaternary ammonium base to the total silicon source can be (0.05-0.2):1.

In an embodiment, the molar ratio of the organic amine to the total silicon source can be (0-0.45):1.

In an embodiment, the molar ratio of the organic amine to the total silicon source can be (0-0.35):1.

In an embodiment, the molar ratio of the organic amine to the total silicon source can be (0.05-0.25):1.

In an embodiment, the molar ratio of the organic quaternary ammonium salt to the total silicon source can be (0-0.45):1.

In an embodiment, the molar ratio of the organic quaternary ammonium salt to the total silicon source can be (0.05-0.3):1.

In an embodiment, the molar ratio of the organic quaternary ammonium base to the organic amine can be 1:(0-10)

In an embodiment, the molar ratio of the organic quaternary ammonium base to the organic amine can be 1:(0-8)

In an embodiment, the molar ratio of the organic quaternary ammonium base to the organic quaternary ammonium salt can be 1:(0-10).

In an embodiment, the molar ratio of the organic quaternary ammonium base to the organic quaternary ammonium salt can be 1:(0-8).

In an embodiment, the molar ratio of the organic quaternary ammonium base to the total silicon source can be (0.05-0.45):1.

In an embodiment, the template agent can comprise an organic base, wherein the organic base is an organic quaternary ammonium base and/or an organic amine.

In an embodiment, the molar ratio of the organic base to the total silicon source can be not less than 0.04:1.

In an embodiment, the molar ratio of the organic base to the total silicon source can be not less than 0.05:1.

In an embodiment, the molar ratio of the organic base to the total silicon source can be (0.05-0.45):1.

In an embodiment, the template agent can comprise an organic base, wherein the organic base is one or more of an organic quaternary ammonium base, a long-chain alkyl ammonium hydroxide and an organic amine.

In an embodiment, the molar ratio of the organic base to the total silicon source can be not less than 0.04:1.

In an embodiment, the molar ratio of the organic base to the total silicon source can be not less than 0.05:1.

In an embodiment, the molar ratio of the organic base to the total silicon source can be (0.05-0.45):1.

In an embodiment, the template agent can comprise an organic quaternary ammonium compound, wherein the organic quaternary ammonium compound is an organic quaternary ammonium base and/or an organic quaternary ammonium salt.

In an embodiment, the molar ratio of the organic quaternary ammonium compound to the total silicon source can be not less than 0.05:1.

In an embodiment, the molar ratio of the organic quaternary ammonium compound to the total silicon source can be (0.05-0.45):1.

In an embodiment, the molar ratio of the organic quaternary ammonium compound to the total silicon source can be (0.05-0.30):1.

In an embodiment, the molar ratio of the organic quaternary ammonium compound to the total silicon source can be (0.05-0.25):1.

In an embodiment, the molar ratio of the organic quaternary ammonium compound to the total silicon source can be (0.05-0.20):1.

In an embodiment, the template agent is an organic quaternary ammonium salt and an organic amine.

In an embodiment, the molar ratio of the organic quaternary ammonium salt to the total silicon source can be (0.05-0.3):1.

In an embodiment, the molar ratio of the organic quaternary ammonium salt to the total silicon source can be (0.05-0.2):1.

In an embodiment, the molar ratio of the organic amine to the total silicon source can be (0.05-0.45):1.

In an embodiment, the molar ratio of the organic amine to the total silicon source can be (0.05-0.40):1.

In an embodiment, the molar ratio of the organic amine to the total silicon source can be (0.05-0.35):1.

In an embodiment, the molar ratio of the organic amine to the total silicon source can be (0.05-0.30):1.

In an embodiment, the molar ratio of the organic amine to the total silicon source can be (0.10-0.25):1.

In an embodiment, the molar ratio of the organic amine to the total silicon source can be (0-0.40):1.

In an embodiment, the template agent can comprise an organic quaternary ammonium salt and an organic amine.

In an embodiment, the molar ratio of the organic quaternary ammonium salt to the total silicon source can be (0.05-0.3):1.

In an embodiment, the molar ratio of the organic quaternary ammonium salt to the total silicon source can be (0.05-0.2):1.

In an embodiment, the molar ratio of the organic amine to the total silicon source can be (0.05-0.45):1.

In an embodiment, the molar ratio of the organic amine to the total silicon source can be (0.05-0.40):1.

In an embodiment, the molar ratio of the organic amine to the total silicon source can be (0.05-0.35):1.

In an embodiment, the molar ratio of the organic amine to the total silicon source can be (0.05-0.30):1.

In an embodiment, the molar ratio of the organic amine to the total silicon source can be (0.10-0.25):1.

In an embodiment, the molar ratio of the organic amine to the total silicon source can be (0-0.40):1.

In an embodiment, the template agent can comprise a long-chain alkyl ammonium compound.

In an embodiment, the molar ratio of the long-chain alkyl ammonium compound to the total silicon source can be (0.05-0.40):1.

In an embodiment, the molar ratio of the long-chain alkyl ammonium compound to the total silicon source can be (0.05-0.35):1.

In an embodiment, the molar ratio of the long-chain alkyl ammonium compound to the total silicon source can be (0.05-0.25):1.

In an embodiment, the template agent can comprise an organic quaternary ammonium compound and a long-chain alkyl ammonium compound, and optionally an organic amine compound, wherein the molar ratio of the organic quaternary ammonium compound to the total silicon source can be (0.04-0.45):1, the molar ratio of the long-chain alkyl ammonium compound to the total silicon source can be (0.04-0.45):1, the molar ratio of the organic amine to the total silicon source can be (0-0.4):1.

In an embodiment, in the process for synthesizing the titanium silicalite molecular sieve of the present invention, the template agent comprises an organic quaternary ammonium compound and a long-chain alkyl ammonium compound, wherein the molar ratio of the organic quaternary ammonium compound to the total silicon source can be (0.05-0.45):1, the molar ratio of the long-chain alkyl ammonium compound to the total silicon source can be (0.05-0.45):1.

In an embodiment, in the process for synthesizing the titanium silicalite molecular sieve of the present invention, the template agent at least comprises an organic base. The organic base is one or more of the organic quaternary ammonium base, the organic amine, and the alkaline long-chain alkyl ammonium compound. The molar ratio of the organic base in the template agent to the total silicon source can be (0.04-0.5):1, for example, (0.05-0.45):1.

Total Silicon Source

According to the present invention, the total silicon source is a combination of the organic silicon source and the inorganic silicon source (also called as the solid silicon source).

According to the present invention, the organic silicon source can be an organic silicate.

The organic silicate can have a general formula of $Si(OR^1)_4$, $R^1$ can be $C_1$-$C_6$alkyl, e.g. $R^1$ can be $C_1$-$C_4$alkyl, said alkyl is linear or branched.

The organic silicate can be one or more of tetramethyl orthosilicate, tetraethyl orthosilicate, tetrabutyl orthosilicate, and dimethyl diethyl orthosilicate.

Among other, the preferable is one or more of tetramethyl orthosilicate, tetraethyl orthosilicate, dimethyl diethyl orthosilicate.

According to the present invention, the solid silicon source can be high purity silica solid or powder.

In an embodiment, on a dry basis and by weight, the solid silicon source has a $SiO_2$ content of not less than 99.99 wt %, and a total weight content of Fe, Al and Na by atom of less than 10 ppm.

In an embodiment, on a dry basis and by weight, the solid silicon source has a $SiO_2$ content of 99.99 wt % to 100 wt %, generally more than 99.99 wt % and less than 100 wt %.

In an embodiment, the solid silicon source can be carbon white and/or high purity silica gel.

In an embodiment, on a dry basis and by weight, said high purity silica gel can have a $SiO_2$ content of not less than 99.99 wt %, for example, more than 99.99 wt % and less than 100 wt %, and a total weight content of Fe, Al and Na by atom of less than 10 ppm.

In an embodiment, on a dry basis and by weight, the carbon white can have a $SiO_2$ content of not less than 99.99 wt %, for example, 99.99 wt % to 100 wt %, or, more than 99.99 wt % and less than 100 wt %, and a total weight content of Fe, Al and Na by atom of less than 10 ppm.

In an embodiment, the carbon white can have a specific surface area of (50-400)$m^2$/g.

The carbon white is commercially available, or can be prepared according to the existing method. For example, the method of preparing the carbon white is disclosed in CN101798088B. For example, the carbon white can be obtained through the combustion reaction of SiCl4, H2 and O2.

Inorganic Amine Source

According to the present invention, the inorganic amine source can be inorganic ammonium salt and/or aqueous ammonia. The inorganic ammonium salt can be one or more of ammonium chloride, ammonium nitrate, and ammonium sulphate. The inorganic amine source is preferably aqueous ammonia.

The introduction of the inorganic amine source (e.g. inorganic ammonium salt) can increase the framework Ti content of the synthesized molecular sieve, and can increase the activity of the molecular sieve.

Titanium Silicalite Molecular Sieve

The present invention further provides a titanium silicalite molecular sieve, which is characterized in that: the crystal grain of the titanium silicalite molecular sieve is rich of silicon on the surface, the crystal grain has a ratio of (surface Si/Ti molar ratio) to (bulk Si/Ti molar ratio) being larger than 1.1, for example 1.1-5. The ratio of (surface Si/Ti ratio):(bulk Si/Ti ratio) is for example 1.2-4:1.

The surface Si/Ti ratio of the crystal grain of the titanium silicalite molecular sieve can be obtained by measuring the Si/Ti ratio of the atom layer being 5 nm or less away from the crystal grain's surface with XPS or TEM-EDX.

The bulk Si/Ti ratio of the crystal grain of the titanium silicalite molecular sieve can be obtained by measuring a zone being 20 nm or more away from the crystal grain's surface with chemical analysis, XPS, XRF or TEM-EDX.

The ratio of (surface Si/Ti ratio):(bulk Si/Ti ratio) is an average of the measurement from at least 15 particles.

The titanium silicalite molecular sieve can have a crystal grain size (in the short axis direction) of 140 nm to 2 μm, e.g. 200 nm to 2 μm, or, 200 nm to 700 nm.

The titanium silicalite molecular sieve particle is a single crystal grain or an aggregate formed by multiple crystal grains.

The titanium silicalite molecular sieve can be a TS-1 molecular sieve, a TS-2 molecular sieve or a Ti-beta molecular sieve.

The titanium silicalite molecular sieve can be a MFI-structured Ti—Si micropore and mesopore complex molecular sieve, a MEL-structured Ti—Si micropore and mesopore complex molecular sieve, or a BEA-structured Ti—Si micropore and mesopore complex molecular sieve.

In an embodiment, the titanium silicalite molecular sieve is a TS-1 molecular sieve, the used template agent can be tetrapropylammonium hydroxide, or can be a mixture of tetrapropylammonium hydroxide and one or more of the organic amine, tetrapropylammonium chloride, and tetrapropylammonium bromide.

In an embodiment, The titanium silicalite molecular sieve is a TS-2 molecular sieve, the used template agent can be tetrabutylammonium hydroxide, or can be a mixture of tetrabutylammonium hydroxide and one or more of the organic amine, tetrabutylammonium chloride, and tetrabutylammonium bromide.

In an embodiment, the titanium silicalite molecular sieve is a Ti-beta molecular sieve, the used template agent can be tetraethylammonium hydroxide, or can be a mixture of tetraethylammonium hydroxide and one or more of the organic amine, tetraethylammonium chloride, and tetraethylammonium bromide.

In an embodiment, the titanium silicalite molecular sieve is a TS-1 molecular sieve, the used template agent can be a mixture of tetrapropylammonium chloride and/or tetrapropylammonium bromide and the organic amine.

In an embodiment, the titanium silicalite molecular sieve is a TS-2 molecular sieve, the used template agent can be a mixture of tetrabutylammonium chloride and/or tetrabutylammonium bromide and the organic amine.

In an embodiment, the titanium silicalite molecular sieve is a Ti-beta molecular sieve, the used template agent can be a mixture of tetraethylammonium chloride and/or tetraethylammonium bromide and the organic amine.

In an embodiment, the titanium silicalite molecular sieve is a MFI-structured Ti—Si micropore and mesopore complex molecular sieve, the used organic quaternary ammonium compound can comprise or can be one or more of tetrapropylammonium hydroxide, tetrapropylammonium chloride and tetrapropylammonium bromide.

In an embodiment, the molar ratio of one or more of tetrapropylammonium hydroxide, tetrapropylammonium chloride and tetrapropylammonium bromide to the total silicon source can be not less than 0.01:1, for example, (0.02-0.2):1, or (0.04-0.15):1.

In an embodiment, the titanium silicalite molecular sieve is a MEL-structured Ti—Si micropore and mesopore complex molecular sieve, the used organic quaternary ammonium compound can comprise or can be one or more of tetrabutylammonium hydroxide, tetrabutylammonium bromide and tetrabutylammonium chloride. In an embodiment, the molar ratio of one or more of tetrabutylammonium hydroxide, tetrabutylammonium bromide and tetrabutylammonium chloride to the total silicon source can be not less than 0.01:1, for example, (0.02-0.2):1, or (0.04-0.15):1.

In an embodiment, the titanium silicalite molecular sieve is a BEA-structured Ti—Si micropore and mesopore complex molecular sieve, the used organic quaternary ammonium compound can comprise or can be one or more of tetraethylammonium hydroxide, tetraethylammonium bromide and tetraethylammonium chloride. In an embodiment, the molar ratio of one or more of tetraethylammonium hydroxide, tetraethylammonium bromide and tetraethylammonium chloride to the total silicon source can be not less than 0.01:1, for example, (0.02-0.2):1, or (0.04-0.15):1.

Synthesis Process

In an embodiment, the process for synthesizing the titanium silicalite molecular sieve of the present invention comprises the following steps of:

(1) a titanium source, a template agent, an organic silicon source, an inorganic amine source and water are mixed and stirred;

(2) the product obtained in the step (1) is aged;

(3) the aged product obtained in the step (2) and a solid silicon source are mixed homogeneously, then subjected to crystallization in a close reaction vessel, the titanium silicalite molecular sieve is collected; and (4) optionally, the molecular sieve is recrystallized.

In the step (1), the inorganic amine source is preferably aqueous ammonia.

In an embodiment, the molar ratio of aqueous ammonia to the total silicon source can be (0.01-0.1):1.

In an embodiment, the molar ratio of aqueous ammonia to the total silicon source can be (0.01-0.07):1.

In an embodiment, the molar ratio of aqueous ammonia to the total silicon source can be (0.01-0.05):1.

In an embodiment, the molar ratio of aqueous ammonia to the titanium source can be (0-5):1.

In an embodiment, the molar ratio of aqueous ammonia to the titanium source can be (0.01-4):1.

In an embodiment, the molar ratio of aqueous ammonia to the titanium source can be (0.01-0.5):1.

In the step (1), a titanium source, a template agent, an organic silicon source, an inorganic amine source and water are mixed, the resulting mixture is stirred at 0° C. to 150° C., e.g. 0° C. to 100° C., e.g. 10° C. to 100° C., e.g. 20° C. to 100° C., e.g. 50° C. to 95° C., e.g. 50° C. to 90° C. for at least 10 minutes, so that the organic silicon source and the titanium source are hydrolyzed, and the content of monohydric alcohol in the resulting mixture is reduced, i.e. being subjected to hydrolyzation and removing alchohols. Generally, the stirring time is 10 minutes to 3000 minutes, e.g. 2 hours to 30 hours.

By hydrolyzation and removing alchohols, a clear hydrolysis solution of the organic silicon source and the titanium source is obtained. Generally, in the mixture obtained in the step (1), the weight content of alcohols produced by hydrolyzation of the organic silicon source and the titanium source is not higher than 10 ppm. Preferably, the weight content of monohydric alcohol in the mixture obtained in the step (1) is not higher than 10 ppm.

In the step (2), the product obtained in the step (1) is aged. Said aging is to keep the product obtained in the step (1) by standing at room temperature to 50° C. for 1 hour to 60 hours. Said room temperature is 15° C. to 40° C.; the aging time is 1 hour to 60 hours, e.g. 2 hours to 50 hours, e.g. 3 hours to 50 hours, e.g. 3 hours to 30 hours, e.g. 3 hours to 15 hours. No stirring is conducted during the aging, and the product obtained in the step (1) is kept by standing.

In the step (3), the aged product obtained in the step (2) and the solid silicon source are mixed, the molar ratio of the product obtained in the step (2) and the solid silicon source, as $SiO_2$, is 1:(0.10-10) (i.e. the molar ratio of the organic silicon source to the solid silicon source, being equal to the weight ratio), e.g. 1:(0.2-9), or 1:(1-9), or 1:(2-8) or 1:(1-7) or 1:(3-7) or 1:(3-6). The aged product obtained in the step (2) and the solid silicon source are mixed and stirred homogeneously. Generally, the stirring time is at least 15 minutes, e.g. 0.5 hour to 5 hours.

In the process for synthesizing the titanium silicalite molecular sieve of the present invention, a higher proportion of the solid silicon source can be used, the solid content of the crystallization product can be increased, and therefore the output for a single synthesis can be increased without changing the synthesis reactor.

In the step (3), the crystallization temperature is 110° C. to 200° C., for example, 140° C. to 180° C., or 160° C. to 180° C.

In the step (3), the crystallization pressure is an autogenous pressure.

In the step (3), the crystallization time is 2 hours to 20 days, 0.5 day to 20 days, 0.5 day to 10 days, or 1 day to 6 days, or 0.5 day to 6 days, or 0.5 day to 3 days, or 1 day to 3 days.

The crystallization can be conducted in a stainless steel stirring vessel.

The temperature rise in the crystallization can be a one-stage temperature rise, or a multiple-stage temperature rise. The temperature rise in the crystallization can be conducted in a conventional manner. The rate in the temperature rise can be (0.5-1°) C/min.

In an embodiment, the crystallization is conducted under the following conditions: the crystallization temperature is 160° C. to 180° C., the crystallization time is 0.5 day to 6 days or 0.5 day to 3 days or 1 day to 3 days, the crystallization pressure is an autogenous pressure.

In an embodiment, the crystallization is conducted under the following conditions: the crystallization is performed at 100° C. to 130° C., e.g. at 110° C. to 130° C. for 0.5 day to 1.5 days, and then at 160° C. to 180° C. for 1 day to 3 days, the crystallization pressure is an autogenous pressure.

In the step (3), the procedure for collecting the titanium silicalite molecular sieve is a conventional method, and can comprise filtering the crystallization product and washing and calcining, or filtering the crystallization product and washing, drying and calcining.

The object of filtering is to separate the titanium silicalite molecular sieve obtained by crystallization from the crystallization mother liquor;

The object of washing is to wash off the silicon-containing template agent solution (e.g. TPAOH solution) adsorbed on the surface of the molecular sieve particles;

The object of drying is to remove most water in the molecular sieve to reduce the water evaporation amount during calcination;

The object of calcination is to remove the template agent in the molecular sieve.

In the step (3), the washing can be conducted with water, wherein the weight ratio of the molecular sieve to water can be 1:(1-20) or 1:(1-15). The washing temperature can be room temperature to 50° C.

The drying temperature can be 100° C. to 200° C.

The calcination temperature can be 350° C. to 650° C. The calcination time can be 2 hours to 10 hours.

The product of titanium silicalite molecular sieve according to the present invention is obtained through the collection.

According to the process for synthesizing the titanium silicalite molecular sieve of the present invention, the titanium silicalite molecular sieve obtained by the collection in the step (3) can also be subjected to a molecular sieve rearrangement, i.e., the titanium silicalite molecular sieve obtained in the step (3) is subjected to crystallization in an organic base solution, and then the titanium silicalite molecular sieve is collected. This procedure allows the obtained titanium silicalite molecular sieve to have a hollow structure.

Specifically, the titanium silicalite molecular sieve obtained in the step (3), an organic base and water are mixed. The resulting mixture is subjected to crystallization in a close reaction vessel, and then the product is collected; wherein the crystallization pressure can be an autogenous pressure; the crystallization temperature can be 100° C. to 200° C., or 100° C. to 150° C., or 120° C. to 200° C., or 150° C. to 200° C., the crystallization time can be 0.1 day to 10 days, or 0.5 day to 10 days, or 0.5 day to 8 days, or 0.5 day to 6 days, or 1 day to 6 days.

In an embodiment, in the step (4), the molar ratio of the titanium silicalite molecular sieve:the organic base:water can be 1:(0.02-0.5):(2-50), for example, 1:(0.05-0.2):(2-20).

In an embodiment, in the step (4), the molar ratio of the titanium silicalite molecular sieve to the organic base can be 1:(0.02-0.5), or 1:(0.02-0.2), the molar ratio of the titanium silicalite molecular sieve to water can be 1:(2-50), 1:(2-30), 1:(2-20), or 1:(5-10).

In the step (4), the organic base is an organic quaternary ammonium base and/or an organic amine, the organic quaternary ammonium base is for example one or more tetrapropylammonium hydroxide, tetrabutylammonium hydroxide and tetraethylammonium hydroxide; the organic amine is one or more of aliphatic amine, aromatic amine and alcoholic amine, the aliphatic amine can have a general formula of $R^3(NH_2)_n$, wherein $R^3$ is $C_{1-4}$alkyl or $C_{1-4}$alkylene, n is 1 or 2; the alcoholic amine can have a general formula of $(HOR^4)_mNH_{(3-m)}$, wherein $R^4$ is $C_1$-$C_4$alkyl, m is 1, 2 or 3. The aliphatic amine is for example one or more of ethylamine, n-butylamine, butylene diamine and hexamethylene diamine. The aromatic amine refers to an amine having an aromatic substituent, e.g. one or more of aniline, amino toluene, p-phenylene diamine. The alcoholic amine is for example one or more of monoethanolamine, diethanolamine and triethanolamine.

In the step (4), the organic base is preferably an organic quaternary ammonium base, wherein the molar ratio of the molecular sieve (as $SiO_2$) to the organic quaternary ammonium base is 1:(0.02-0.5), for example, 1:(0.05-0.2); the molar ratio of the molecular sieve (as $SiO_2$) to water is 1:(2-50), for example, 1:(2-20), or 1:(5-10), the crystallization temperature is 120° C. to 200° C., the crystallization time is 0.5 day to 8 days, the crystallization pressure is an autogenous pressure. Preferably, in the step (4), the crystallization temperature is 150° C. to 200° C., and the crystallization time is 0.5 day to 6 days.

In the step (4), the collection procedure is conventional, and a reference can be made to the collection procedure in the step (3). It generally comprises filtering the crystallization product, washing, drying (optionally) and calcination.

In an embodiment, the titanium silicalite molecular sieve is a TS-1 molecular sieve, and the organic quaternary ammonium base used in the step (4) is tetrapropylammonium hydroxide.

In an embodiment, the titanium silicalite molecular sieve is a TS-2 molecular sieve, and the organic quaternary ammonium base used in the step (4) is tetrabutylammonium hydroxide.

In an embodiment, the titanium silicalite molecular sieve is a Ti-beta molecular sieve, and the organic quaternary ammonium base used in the step (4) is tetraethylammonium hydroxide.

In an embodiment, the titanium silicalite molecular sieve is a MFI-structured Ti—Si micropore and mesopore molecular sieve, and the organic quaternary ammonium base used in the step (4) is tetrapropylammonium hydroxide.

In an embodiment, the titanium silicalite molecular sieve is a MEL-structured Ti—Si micropore and mesopore molecular sieve, and the organic quaternary ammonium base used in the step (4) is tetrabutylammonium hydroxide.

In an embodiment, the titanium silicalite molecular sieve is a BEA-structured Ti—Si micropore and mesopore molecular sieve, and the organic quaternary ammonium base used in the step (4) is tetraethylammonium hydroxide.

The rearrangement of the molecular sieve in the step (4) can be conducted once, or can be repeated once or more than once. Said repeating is to conduct the treatment of the step (4) but replace the titanium silicalite molecular sieve obtained in the step (3) with the molecular sieve that has been treated in the step (4).

Through the rearrangement treatment, a titanium silicalite molecular sieve having a secondary pore structure can be obtained. The crystal grain of the obtained titanium silicalite molecular sieve has a hollow structure, with a radial length of 5-300 nm for the cavity portion of the hollow grain, the adsorption capacity of benzene measured for the molecular sieve sample under the conditions of 25° C., P/P0=0.10 and 1 hour of adsorption time is at least 70 mg/g, and there is a hysteresis loop between the adsorption isotherm and the desorption isotherm for nitrogen adsorption by the molecular sieve at a low temperature. The molecular sieve has a higher pore volume and specific surface area.

Measurement

The surface Si/Ti ratio of the crystal grain of the titanium silicalite molecular sieve can be obtained by measuring the Si/Ti ratio of the atom layer being 5 nm or less away from the crystal grain's surface with XPS or TEM-EDX.

The bulk Si/Ti ratio of the crystal grain of the titanium silicalite molecular sieve can be obtained by measuring a zone being 20 nm or more away from the crystal grain's surface with chemical analysis, XPS, XRF or TEM-EDX.

The ratio of (surface Si/Ti ratio):(bulk Si/Ti ratio) is an average of the measurement from at least 15 particles According to the present invention, the crystal grain size is determined with SEM.

The change in the Si/Ti atom ratio within the 10 nm depth from the surface of the crystal grain of the titanium silicalite molecular sieve to the interior of the crystal grain of the titanium silicalite molecular sieve is obtained by the XPS etching.

Instruments

The XRD result is obtained by using Siemens D5005 type X-ray diffractometer.

Radiation source: CuKα (λ=1.5418 Å), tube voltage: 40 kV, tube current: 40 mA, scan speed: 0.5°/min, scan range: 2θ=4°-40°.

BET specific surface area and pore volume are determined by the nitrogen adsorption capacity measurement in combination with the BJH calculation method, according to the standard method RIPP151-90. A reference can be made to Analytical Methods in Petrochemical Industry (RIPP Experiment Techniques), Yang Cuiding et. al, Science Press, 1990.

The SEM result is obtained by using Quanta 200F type scanning electron microscope (manufactured by FEI) is used. The sample is dried, and coated with golden by vacuum evaporation to increase the electric conductivity and the contrast effect. The analysis electron microscope acceleration voltage is 20.0 kV, and the magnification is 1-30 k.

The XPS result is obtained by using ESCALAB 250 type X-ray Photoelectron Spectrometer (manufactured by Thermo Fischer-VG), Al Kα monochromator, Mg/Al binode, Mg Kα X-ray, Power: 200 W, the binding energy is corrected with alkyl carbon or the contaminated C1s peak (284.8 eV).

Etching analysis is used with Ar+ sputtering, excitation source: binode Mg Kα X, the basic vacuum degree is about $6.5\times10^{-7}$ Pa (in the analysis process).

The TEM or TEM-EDX result is obtained by using Tecnai F20 G2S-TWIN type transmission electron microscope (manufactured by FEI), which is equipped with an energy filtering system GIF2001 (Gatan). The accessory is provided with an X-ray energy spectrometer. The electron microscope sample is dispersed by suspension onto a micro-grid with a diameter of 3 mm.

The XRF result is obtained by using 3271E type X-ray fluorescence spectrometer (Rigaku Industrial Corporation). The sample is obtained with powder tabletting. Target: rhodium, excitation voltage: 50 kV, excitation current: 50 mA. The spectral line intensity of each element is detected by a scintillation counter and a proportional counter.

Material

Tetrapropylammonium bromide, Guang Dong Dayou Chemical plant, with a concentration of 20.05 wt %.

Tetrapropylammonium chloride, Guang Dong Dayou Chemical plant, with a concentration of 20.05 wt %.

Tetrapropylammonium hydroxide (TPAOH), Guang Dong Dayou Chemical plant, with a concentration of 25.05 wt %.

Tetraethyl orthosilicate, analytically pure, Sinopharm Chemical Reagent limited corporation.

Tetrapropylammonium bromide solid, analytically pure, Sinopharm Chemical Reagent limited corporation.

Long-chain alkyl trimethyl ammonium bromide, analytically pure, Sinopharm Chemical Reagent limited corporation.

Aqueous ammonia, analytically pure, 20 wt %.

Carbon white, available from JuHua (ZheJiang), Model AS-150; solid content >95 wt %, $SiO_2$ content (dry basis) >99.99 wt %, Total content of Fe, Na and Al<10 ppm, Specific surface area 195 m2/g.

Tetrabutyl titanate, analytically pure, Sinopharm Chemical Reagent limited corporation.

Titanyl sulphate, analytically pure, Sinopharm Chemical Reagent limited corporation.

Other agents are commercially available, analytically pure.

Triethylamine, analytically pure, Sinopharm Chemical Reagent limited corporation.

Ethylene diamine, analytically pure, Sinopharm Chemical Reagent limited corporation.

In the examples, the surface Si/Ti ratio and the bulk Si/Ti ratio was measured with TEM-EDX. For each sample, 20 particles were chosen at random and measured for the surface Si/Ti ratio and the bulk Si/Ti ratio, then the ratio of (surface Si/Ti ratio):(bulk Si/Ti ratio) was calculated. The average of the 20 calculation values was recorded as the ratio of (surface Si/Ti ratio):(bulk Si/Ti ratio) of the sample.

Example 1

(1) To a 500 mL baker, were successively added 15 g of an aqueous tetrapropylammonium hydroxide (TPAOH) solution (in a concentration of 25.05 wt %), 2.04 g of tetrabutyl titanate, 8.5 g of tetraethyl orthosilicate, 2 g of aqueous ammonia (in a concentration of 20 wt %) and 38 g of water. A magnetic stirring bar with heating and stirring functions was placed in the baker. The mixture was stirred at 80° C. for 4 hours. Water was supplemented to the mixture, if necessary. A colorless and clear hydrolysis solution was obtained.

(2) The resulting hydrolysis solution was kept by standing at 26° C. for 12 hours to produce an aged product.

(3) To the aged product, was added under stirring 9.6 g of carbon white powder. The resulting mixture was stirred for 1 hour to form a viscous substance, which was transferred to a close stainless steel reaction vessel, and crystallized at a constant temperature of 165° C. for 2 days. After filtering the resulting mixture, the filter cake was washed, dried at 120° C. for 24 hours, calcined at 550° C. for 6 hours to produce a TS-1 molecular sieve product TS-1 F1, which had a BET specific surface area of 426 m2/g, an exterior surface area of 60 m2/g, a micropore volume of 0.166 mL/g, and a mesopore volume of 0.086 mL/g.

XRD analysis showed that the molecular sieve had a MFI structure.

The XRD spectrum was shown in FIG. 1.

(4) 6 g of the TS-1 molecular sieve product TS-1 F1 and an aqueous TPAOH solution (in a concentration of 22.05 wt %) were mixed homogeneously, the weight ratio of the TS-1 molecular sieve product TS-1 F1 to the aqueous TPAOH solution was 1:5. The resulting mixture was crystallized at 150° C. in a close reaction vessel for 3 days. After filtering the resulting mixture, the filter cake was washed, dried at 120° C. for 24 hours, calcined at 550° C. for 6 hours to produce the recrystallized TS-1 molecular sieve product TS-1 P1, which had a BET specific surface area of 457 m2/g, an exterior surface area of 68 m2/g, a micropore volume of 0.152 mL/g, and a mesopore volume of 0.168 mL/g.

XRD confirmed that the molecular sieve had the similar characteristic peaks as those in FIG. 1, which demonstrated that the molecular sieve had a MFI structure.

Figure 2:
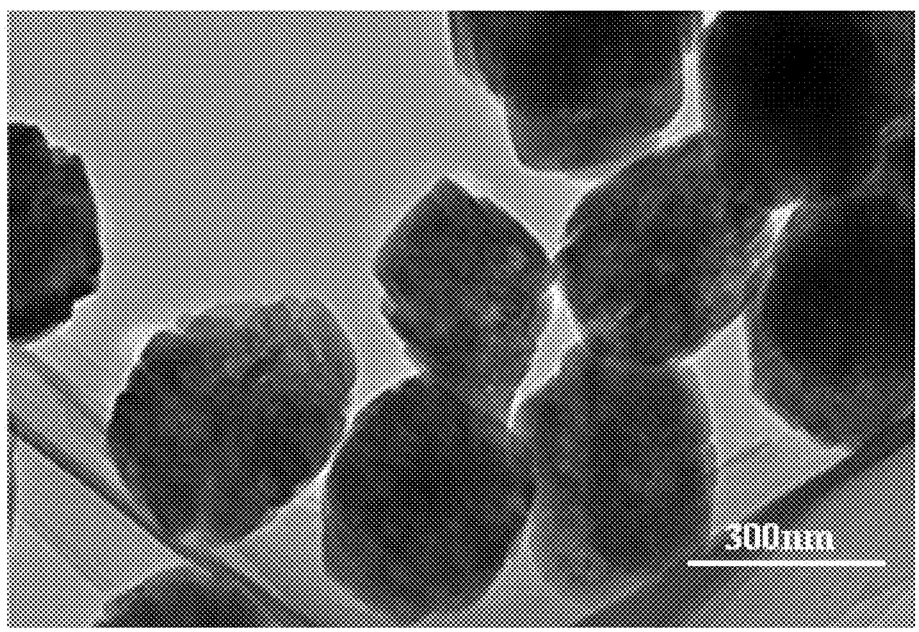
FIG. 2 is a TEM photo of the titanium silicalite molecular sieve.

The transmission electron microscope (TEM) photo showed that the molecular sieve had a hollow structure, as shown in FIG. 2.

Example 2

(1) To a 500 mL baker, were successively added 7.4 g of tetrapropylammonium hydroxide (in a concentration of 25.05 wt %), 1.23 g of tetrabutyl titanate, 4.16 g of tetraethyl orthosilicate, 0.67 g of aqueous ammonia (in a concentration of 20 wt %) and 14 g of water. A magnetic stirring bar with heating and stirring functions was placed in the baker. The mixture was stirred at 90° C. for 1 hour. Water was supplemented to the mixture, if necessary. A colorless and clear alkaline hydrolysis solution was obtained.

(2) The resulting hydrolyzation solution was kept by standing at 26° C. for 3 hours to produce an aged product.

(3) To the aged product, was added slowly under stirring 9.6 g of carbon white powder. The resulting mixture was stirred for 1.5 hours. The resulting mixture was transferred to a close stainless steel reaction vessel, and crystallized at a constant temperature of 145° C. for 6 days. After filtering the resulting mixture, the filter cake was washed, dried at 120° C. for 24 hours, calcined at 550° C. for 6 hours to produce a TS-1 molecular sieve product TS-1 F2, which had a BET specific surface area of 435 m2/g, an exterior surface area of 61 m2/g, a micropore volume of 0.159 mL/g, and a mesopore volume of 0.083 mL/g XRD confirmed that the molecular sieve had the similar characteristic peaks as those in FIG. 1, which demonstrated that the molecular sieve had a MFI structure.

(4) 6 g of the TS-1 molecular sieve product TS-1 F2 and 36 g of an aqueous TPAOH solution (in a concentration of 22.05 wt %) were mixed and stirred homogeneously. The resulting mixture was crystallized at 150° C. in a close reaction vessel for 3 days. After filtering the resulting mixture, the filter cake was washed, dried at 120° C. for 24 hours, calcined at 550° C. for 6 hours to produce the recrystallized TS-1 molecular sieve product TS-1 P2, which had a BET specific surface area of 429 m2/g, an exterior surface area of 60 m2/g, a micropore volume of 0.150 mL/g, and a mesopore volume of 0.177 mL/g.

The transmission electron microscope (TEM) photo showed that the molecular sieve had a hollow structure.

XRD confirmed that the molecular sieve had the similar characteristic peaks as those in FIG. 1, which demonstrated that the molecular sieve had a MFI structure.

Example 3

(1) To a 500 mL baker, were successively added 43 g of an aqueous tetrapropylammonium bromide (TPABr) solution (in a concentration of 25.05 wt %), 1.68 g of titanyl sulphate, 2.4 g of triethylamine, 33.3 g of tetraethyl orthosilicate, 0.05 g of aqueous ammonia (in a concentration of 20 wt %) and 26 g of water. A magnetic stirring bar with heating and stirring functions was placed in the baker. The mixture was stirred at 65° C. for 3 hours. Water was supplemented to the mixture, if necessary. A hydrolysis solution was obtained.

(2) The resulting hydrolysis solution was kept by standing at 26° C. for 9 hours to produce an aged product.

(3) To the aged product, was added slowly under stirring 9.6 g of carbon white powder. The resulting mixture was stirred for 1 hour to form a viscous substance, which was transferred to a close stainless steel reaction vessel, and crystallized at a constant temperature of 165° C. for 2 days. After filtering the resulting mixture, the filter cake was washed, dried at 120° C. for 24 hours, calcined at 550° C. for 6 hours to produce a TS-1 molecular sieve product TS-1 F3, which had a BET specific surface area of 427 m2/g, an exterior surface area of 60 m2/g, a micropore volume of 0.173 mL/g, and a mesopore volume of 0.079 mL/g.

(4) 6 g of the TS-1 molecular sieve product TS-1 F3 and 40 g of an aqueous TPAOH solution (in a concentration of 22.05 wt %) were mixed and stirred homogeneously. The resulting mixture was crystallized at 150° C. in a close reaction vessel for 3 days. After filtering the resulting mixture, the filter cake was washed, dried at 120° C. for 24 hours, calcined at 550° C. for 6 hours to produce the recrystallized TS-1 molecular sieve product TS-1 P3, which had a BET specific surface area of 438 m2/g, an exterior surface area of 59 m2/g, a micropore volume of 0.162 mL/g, and a mesopore volume of 0.183 mL/g.

The transmission electron microscope (TEM) photo showed that the molecular sieve had a hollow structure.

Examples 4-7

Titanium silicalite molecular sieves were prepared according to Example 1. The material, the operation condition and the analysis result for these examples were shown in Tables 1-3. See Example 1 for other conditions.

Example 8

Titanium silicalite molecular sieve was prepared according to Example 1, except that no inorganic amine source was added. The material, the operation condition and the analysis result for this example were shown in Tables 1-3. See Example 1 for other conditions.

Example 9

Titanium silicalite molecular sieve was prepared according to Example 1, except that in the step (3), the crystallization is conducted at 120° C. for 1 day and then at 170° C. for 2 days. The material, the operation condition and the analysis result for this example were shown in Tables 1-3. See Example 1 for other conditions.

Example 10

Titanium silicalite molecular sieve was prepared according to Example 1 (TS-2 molecular sieve), except for the material proportion and the template agent. The used template agent was tetrabutylammonium hydroxide (TBAOH). The material and the operation condition for this example were shown in Tables 1-2.

Example 11

Titanium silicalite molecular sieve was prepared according to Example 1 (Ti-β molecular sieve), except for the material proportion and the template agent. The used template agent was tetraethylammonium hydroxide (TEAOH). The material and the operation condition for this example were shown in Tables 1-2 The XRD spectrum was shown in FIG. 3.

Comparative Example 1

Titanium silicalite molecular sieve was prepared according to Example 1, except that the aging was not conducted. The material, the operation condition and the analysis result for this example were shown in Tables 1-3. See Example 1 for other conditions.

Comparative Example 2

Titanium silicalite molecular sieves were prepared according to Example 1, except that the aging temperature was 75° C. The material, the operation condition and the analysis result for this example were shown in Tables 1-3. See Example 1 for other conditions.

Comparative Example 3

Titanium silicalite molecular sieves were prepared according to Example 1, except that the solid silicon source was added in the step (1). The material, the operation condition and the analysis result for this example were shown in Tables 1-3. See Example 1 for other conditions.

Example 12

(1) To a 500 mL baker, were successively added 19.65 g of an aqueous tetrapropylammonium bromide (TPABr) solution (in a concentration of 25.05 wt %), 2.04 g of tetrabutyl titanate, 8.5 g of tetraethyl orthosilicate, 2.42 g of ethylene diamine, 2 g of aqueous ammonia (in a concentration of 20 wt %) and 35 g of water. A magnetic stirring bar with heating and stirring functions was placed in the baker. The mixture was stirred at 80° C. for 4 hours. Water was supplemented to the mixture, if necessary. A colorless and clear hydrolysis solution was obtained.

(2) The resulting hydrolysis solution was kept by standing at 26° C. for 12 hours to produce an aged product.

(3) To the aged product, was added under stirring 9.6 g of carbon white powder. The resulting mixture was stirred for 1 hour to form a viscous substance, which was transferred to a close stainless steel reaction vessel, and crystallized at a constant temperature of 165° C. for 2 days. After filtering the resulting mixture, the filter cake was washed, dried at 120° C. for 24 hours, calcined at 550° C. for 6 hours to produce a TS-1 molecular sieve product TS-1 F4, which had a BET specific surface area of 420 m2/g, an exterior surface area of 58 m2/g, a micropore volume of 0.165 mL/g, and a mesopore volume of 0.077 mL/g.

XRD confirmed that the molecular sieve had the similar characteristic peaks as those in FIG. 1, which demonstrated that the molecular sieve had a MFI structure.

(4) 6 g of the TS-1 molecular sieve product TS-1 F4 and an aqueous TPAOH solution (in a concentration of 22.5 wt %) were mixed homogeneously, the weight ratio of the TS-1 molecular sieve product TS-1 F4 to the aqueous TPAOH solution was 1:5. The resulting mixture was crystallized at 150° C. in a close reaction vessel for 3 days. After filtering the resulting mixture, the filter cake was washed, dried at 120° C. for 24 hours, calcined at 550° C. for 6 hours to produce the recrystallized TS-1 molecular sieve product TS-1 P4, which had a BET specific surface area of 460 m2/g, an exterior surface area of 65 m2/g, a micropore volume of 0.153 mL/g, and a mesopore volume of 0.173 mL/g.

XRD confirmed that the molecular sieve had the similar characteristic peaks as those in FIG. 1, which demonstrated that the molecular sieve had a MFI structure.

Figure 4:
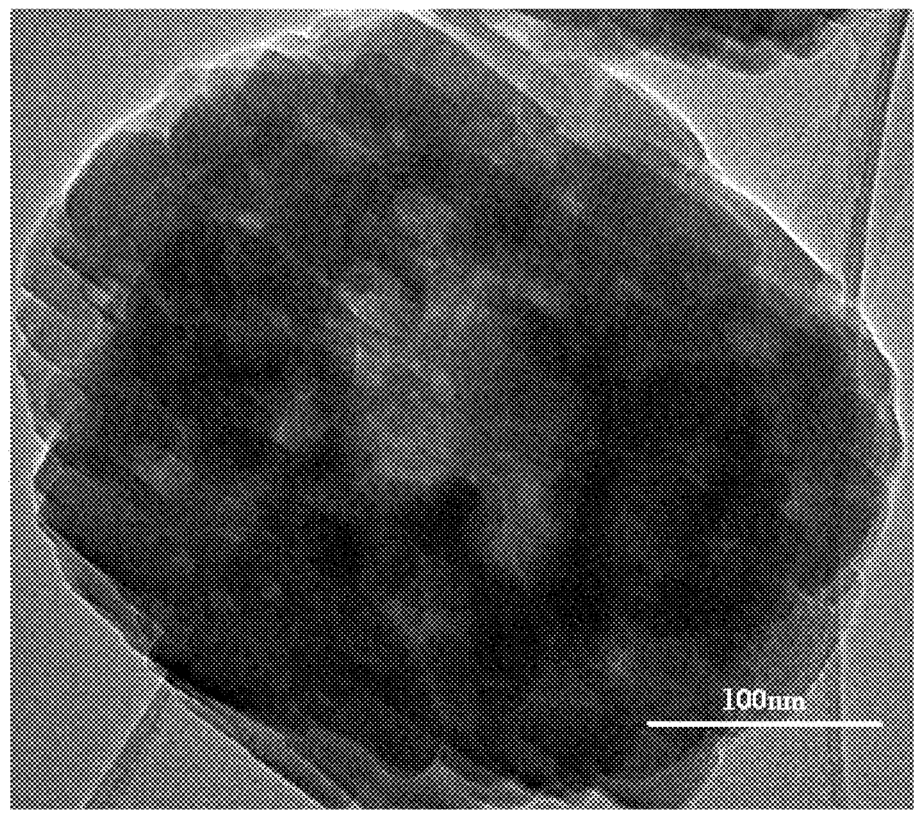
FIG. 4 is a TEM photo of the titanium silicalite molecular sieve.

The transmission electron microscope (TEM) photo showed that the molecular sieve had a hollow structure, as shown in FIG. 4.

Example 13

(1) To a 500 mL baker, were successively added 15 g of tetrapropylammonium bromide (in a concentration of 25.5 wt %), 2.04 g of tetrabutyl titanate, 8.5 g of tetraethyl orthosilicate, 0.55 g of ethylene diamine, 2 g of aqueous ammonia (in a concentration of 20 wt %) and 120 g of water. A magnetic stirring bar with heating and stirring functions was placed in the baker. The mixture was stirred at 90° C. for 1 hour. Water was supplemented to the mixture, if necessary. A colorless and clear alkaline hydrolysis solution was obtained.

(2) The resulting hydrolyzation solution was kept by standing at 26° C. for 3 hours to produce an aged product.

(3) To the aged product, was added slowly under stirring 9.6 g of carbon white powder. The resulting mixture was stirred for 1.5 hours to form a viscous substance, which was transferred to a close stainless steel reaction vessel, and crystallized at a constant temperature of 145° C. for 6 days. After filtering the resulting mixture, the filter cake was washed, dried at 120° C. for 24 hours, calcined at 550° C. for 6 hours to produce a TS-1 molecular sieve product TS-1 F5, which had a BET specific surface area of 428 m2/g, an exterior surface area of 59 m2/g, a micropore volume of 0.173 mL/g, and a mesopore volume of 0.078 mL/g.

XRD confirmed that the molecular sieve had the similar characteristic peaks as those in FIG. 1, which demonstrated that the molecular sieve had a MFI structure.

(4) 6 g of the TS-1 molecular sieve product TS-1 F5 and 36 g of an aqueous TPAOH solution (in a concentration of 22.5 wt %) were mixed and stirred homogeneously. The resulting mixture was crystallized at 150° C. in a close reaction vessel for 3 days. After filtering the resulting mixture, the filter cake was washed, dried at 120° C. for 24 hours, calcined at 550° C. for 6 hours to produce the recrystallized TS-1 molecular sieve product TS-1 P5, which had a BET specific surface area of 442 m2/g, an exterior surface area of 60 m2/g, a micropore volume of 0.167 mL/g, and a mesopore volume of 0.163 mL/g.

The transmission electron microscope (TEM) photo showed that the molecular sieve had a hollow structure.

XRD confirmed that the molecular sieve had the similar characteristic peaks as those in FIG. 1, which demonstrated that the molecular sieve had a MFI structure.

Example 14

(1) To a 500 mL baker, were successively added 43 g of an aqueous tetrapropylammonium bromide solution (in a concentration of 25.05 wt %), 1.68 g of titanyl sulphate, 2.4 g of triethylamine, 33.3 g of tetraethyl orthosilicate, 0.05 g of aqueous ammonia (in a concentration of 20 wt %) and 26 g of water. A magnetic stirring bar with heating and stirring functions was placed in the baker. The mixture was stirred at 65° C. for 3 hours. Water was supplemented to the mixture, if necessary. An alkaline hydrolysis solution was obtained.

(2) The resulting hydrolyzation solution was kept by standing at 26° C. for 9 hours to produce an aged product.

(3) To the aged product, was added slowly under stirring 9.6 g of carbon white powder. The resulting mixture was stirred for 1 hour to form a viscous substance, which was transferred to a close stainless steel reaction vessel, and crystallized at a constant temperature of 165° C. for 2 days. After filtering the resulting mixture, the filter cake was washed, dried at 120° C. for 24 hours, calcined at 550° C. for 6 hours to produce a TS-1 molecular sieve product TS-1 F6, which had a BET specific surface area of 432 m2/g, an exterior surface area of 58 m2/g, a micropore volume of 0.159 mL/g, and a mesopore volume of 0.076 mL/g.

XRD confirmed that the molecular sieve had the similar characteristic peaks as those in FIG. 1, which demonstrated that the molecular sieve had a MFI structure.

(4) 6 g of the TS-1 molecular sieve product TS-1 F6 and 40 g of an aqueous TPAOH solution (in a concentration of 22.05 wt %) were mixed and stirred homogeneously. The resulting mixture was crystallized at 150° C. in a close reaction vessel for 3 days. After filtering the resulting mixture, the filter cake was washed, dried at 120° C. for 24 hours, calcined at 550° C. for 6 hours to produce the recrystallized TS-1 molecular sieve product TS-1 P6, which had a BET specific surface area of 438 m2/g, an exterior surface area of 59 m2/g, a micropore volume of 0.143 mL/g, and a mesopore volume of 0.185 mL/g.

The transmission electron microscope (TEM) photo showed that the molecular sieve had a hollow structure.

XRD confirmed that the molecular sieve had the similar characteristic peaks as those in FIG. 1, which demonstrated that the molecular sieve had a MFI structure.

Examples 15-19

Titanium silicalite molecular sieves were prepared according to Example 12. The material, the operation condition and the analysis result for these examples were shown in Tables 1-3. See Example 12 for other conditions.

Example 20

A titanium silicalite molecular sieve was prepared according to Example 12, except that in the step (3), the crystallization is conducted at 120° C. for 1 day and then at 170° C. for 2 days. The material, the operation condition and the analysis result for this example were shown in Tables 1-3. See Example 1 for other conditions.

Example 21

Titanium silicalite molecular sieve was prepared according to Example 12 (TS-2 molecular sieve), except for the material proportion and the template agent. The used template agent was tetrabutylammonium hydroxide (TBAOH). The material and the operation condition for this example were shown in Tables 1-2.

Example 22

Titanium silicalite molecular sieve was prepared according to Example 12 (Ti-β molecular sieve), except for the material proportion and the template agent. The used template agent was tetraethylammonium hydroxide (TEAOH). The material and the operation condition for this example were shown in Tables 1-2

Figure 3:
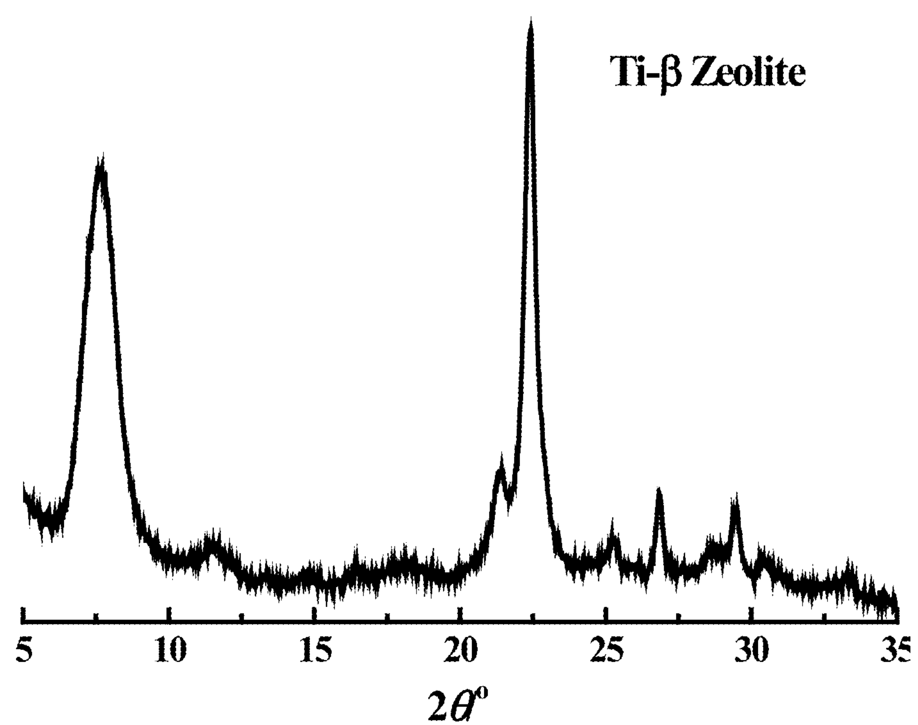
FIG. 3 is a XRD spectrum of the Ti-β molecular sieve.

XRD confirmed that the molecular sieve had the similar characteristic peaks as those in FIG. 3, which demonstrated that the molecular sieve had a BEA structure.

Figure 5:
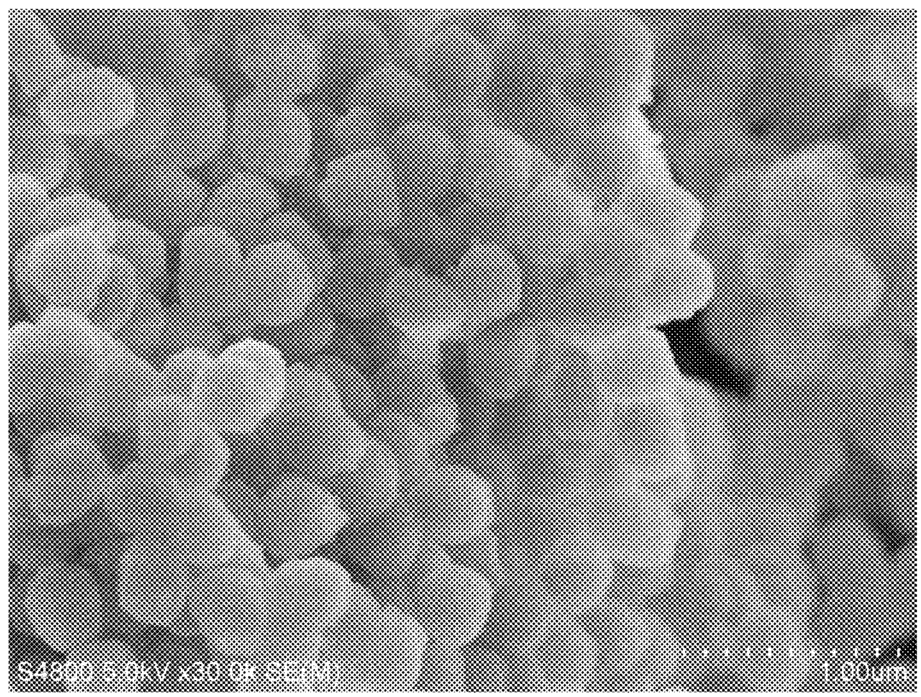
FIG. 5 is a SEM photo of the titanium silicalite molecular sieve.

The SEM photo was shown in FIG. 5.

Comparative Example 4

A titanium silicalite molecular sieve was prepared according to Example 12, except that the aging was not conducted. The material, the operation condition and the analysis result for this example were shown in Tables 1-3. See Example 1 for other conditions.

Comparative Example 5

A titanium silicalite molecular sieve was prepared according to Example 12, except that the aging temperature was 75° C. The material, the operation condition and the analysis result for this example were shown in Tables 1-3. See Example 1 for other conditions.

Comparative Example 6

A titanium silicalite molecular sieve was prepared according to Example 12, except that the solid silicon source was added in the step (1). The material, the operation condition and the analysis result for this example were shown in Tables 1-3. See Example 1 for other conditions.

Example 23

(1) To a 500 mL baker, were successively added 15 g of an aqueous tetrapropylammonium hydroxide (TPAOH) solution (in a concentration of 25.05 wt %), 2.04 g of tetrabutyl titanate, 5.62 g of cetyltrimethylammonium hydroxide (MSDS), 8.5 g of tetraethyl orthosilicate, 2 g of aqueous ammonia (in a concentration of 20 wt %) and 38 g of water. A magnetic stirring bar with heating and stirring functions was placed in the baker. The mixture was stirred at 80° C. for 4 hours. Water was supplemented to the mixture, if necessary. A colorless and clear hydrolysis solution was obtained.

(2) The resulting hydrolysis solution was kept by standing at 26° C. for 12 hours to produce an aged product.

(3) To the aged product, was added under stirring 9.6 g of carbon white powder. The resulting mixture was stirred for 1 hour to form a viscous substance, which was transferred to a close stainless steel reaction vessel, and crystallized at a constant temperature of 165° C. for 2 days. After filtering the resulting mixture, the filter cake was washed, dried at 120° C. for 24 hours, calcined at 550° C. for 6 hours to produce a TS-1 molecular sieve product TS-1 F7, which had a BET specific surface area of 449 m2/g, an exterior surface area of 58 m2/g, a micropore volume of 0.152 mL/g, and a mesopore volume of 0.385 mL/g.

XRD analysis showed that the molecular sieve had a MFI structure.

Figure 6:
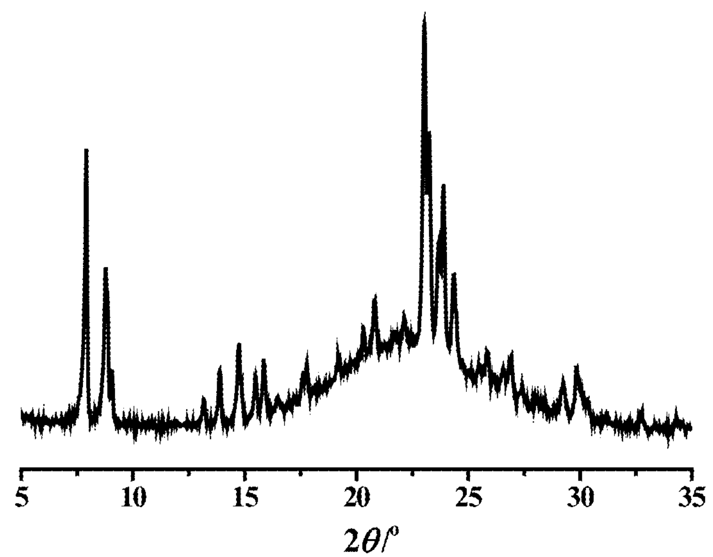
FIG. 6 is a XRD spectrum of the MFI-structured Ti—Si micropore/mesopore molecular sieve.
Figure 7:
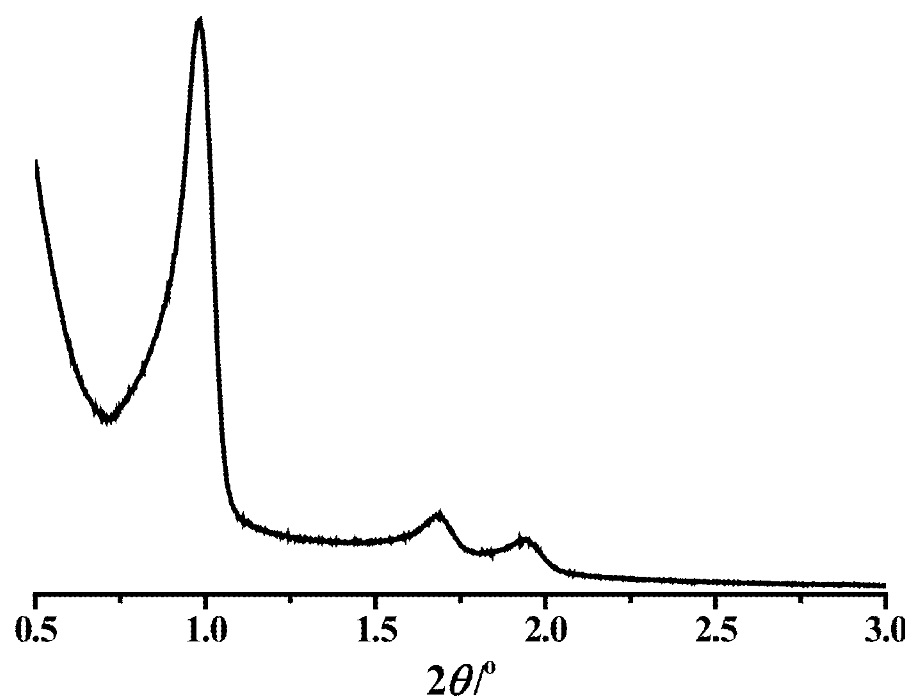
FIG. 7 is a XRD spectrum (at small angle) of the MFI-structured Ti—Si micropore/mesopore molecular sieve.

The XRD spectra were shown in FIG. 6 and FIG. 7

Figure 8:
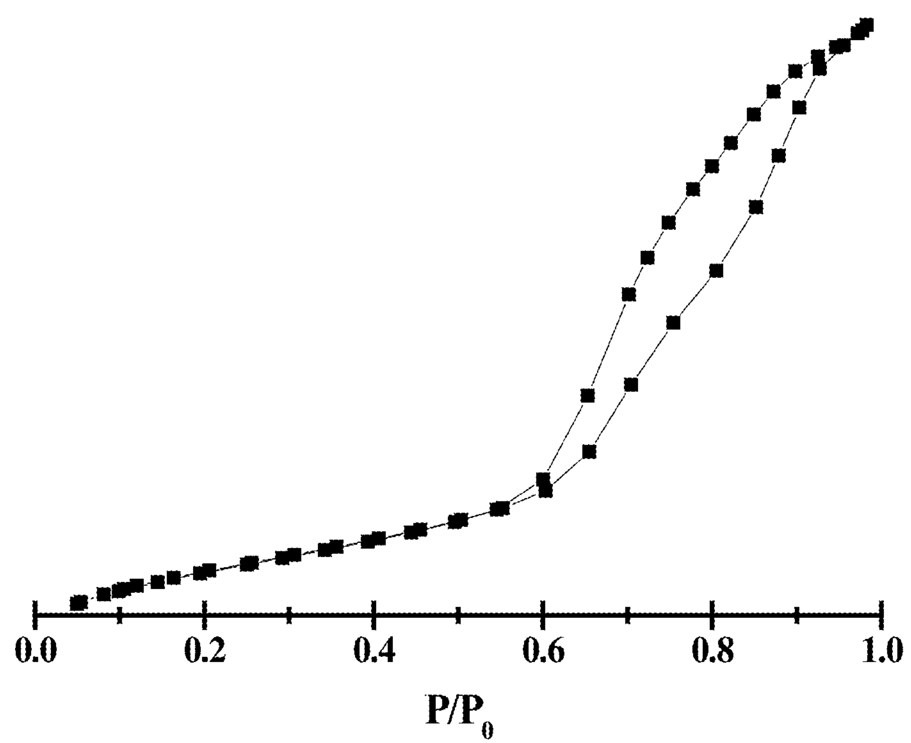
FIG. 8 is a low temperature nitrogen adsorption and desorption curve of the Ti—Si micropore/mesopore molecular sieve

The low temperature nitrogen adsorption and desorption curve was shown in FIG. 8.

(4) 6 g of the TS-1 molecular sieve product TS-1 F7 and an aqueous TPAOH solution (in a concentration of 22.05 wt %) were mixed and stirred homogeneously. The weight ratio of TS-1 F7 to the aqueous TPAOH solution was 1:5. The resulting mixture was crystallized at 150° C. in a close reaction vessel for 3 days. After filtering the resulting mixture, the filter cake was washed, dried at 120° C. for 24 hours, calcined at 550° C. for 6 hours to produce the recrystallized TS-1 molecular sieve product TS-1 P7, which had a BET specific surface area of 477 m2/g, an exterior surface area of 62 m2/g, a micropore volume of 0.153 mL/g, and a mesopore volume of 0.388 mL/g.

XRD confirmed that the molecular sieve had the similar characteristic peaks as those in FIG. 6 and FIG. 7, which demonstrated that the molecular sieve had a MFI structure.

Figure 9:
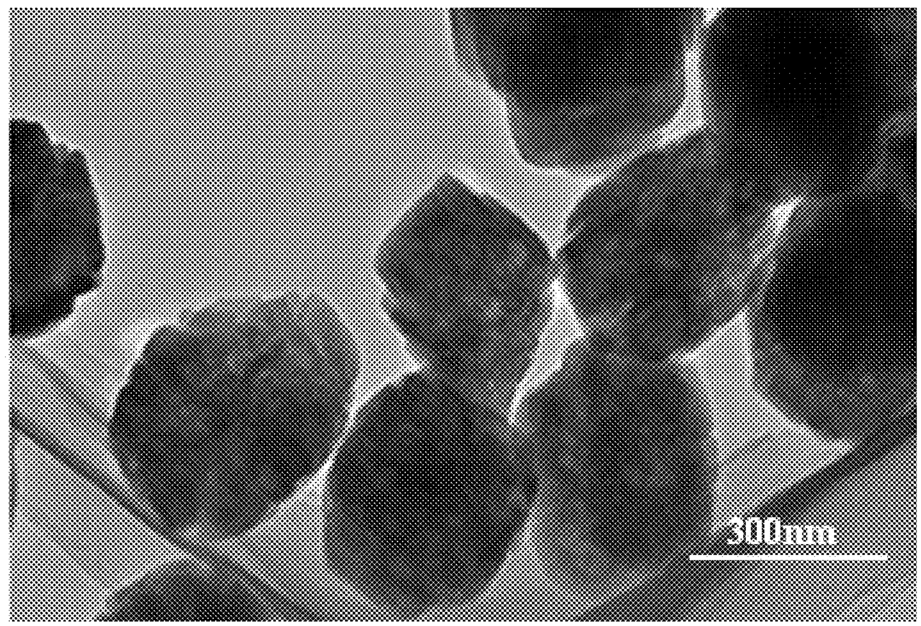
FIG. 9 is a TEM photo of the titanium silicalite molecular sieve.

The transmission electron microscope (TEM) photo showed that the molecular sieve had a hollow structure, as shown in FIG. 9.

Example 24

(1) To a 500 mL baker, were successively added 7.4 g of tetrapropylammonium hydroxide (in a concentration of 25.05 wt %), 1.23 g of tetrabutyl titanate, 3.29 g of cetyltrimethylammonium bromide (CTMAB), 4.16 g of tetraethyl orthosilicate, 0.67 g of aqueous ammonia (in a concentration of 20 wt %) and 14 g of water. A magnetic stirring bar with heating and stirring functions was placed in the baker. The mixture was stirred at 90° C. for 1 hour. Water was supplemented to the mixture, if necessary. A colorless and clear alkaline hydrolysis solution was obtained.

(2) The resulting hydrolyzation solution was kept by standing at 26° C. for 3 hours to produce an aged product.

(3) To the aged product, was added slowly under stirring 9.6 g of carbon white powder. The resulting mixture was stirred for 1.5 hours. The resulting mixture was transferred to a close stainless steel reaction vessel, and crystallized at a constant temperature of 165° C. for 2 days. After filtering the resulting mixture, the filter cake was washed, dried at 120° C. for 24 hours, calcined at 550° C. for 6 hours to produce a TS-1 molecular sieve product TS-1 F8, which had a micropore volume of 0.157 mL/g, and a mesopore volume of 0.365 mL/g XRD confirmed that the molecular sieve had the similar characteristic peaks as those in FIG. 6 and FIG. 7, which demonstrated that the molecular sieve had a MFI structure.

(4) 6 g of the TS-1 molecular sieve product TS-1 F8 and 36 g of an aqueous TPAOH solution (in a concentration of 22.05 wt %) were mixed and stirred homogeneously. The resulting mixture was crystallized at 150° C. in a close reaction vessel for 3 days. After filtering the resulting mixture, the filter cake was washed, dried at 120° C. for 24 hours, calcined at 550° C. for 6 hours to produce the recrystallized TS-1 molecular sieve product TS-1 P8, which had a micropore volume of 0.154 mL/g, and a mesopore volume of 0.372 mL/g.

XRD confirmed that the molecular sieve had the similar characteristic peaks as those in FIG. 6 and FIG. 7, which demonstrated that the molecular sieve had a MFI structure.

The transmission electron microscope (TEM) photo showed that the molecular sieve had a hollow structure.

Example 25

(1) To a 500 mL baker, were successively added 43 g of aqueous tetrapropylammonium bromide solution (in a concentration of 25.05 wt %), 1.68 g of titanyl sulphate, 5.62 g of cetyltrimethylammonium hydroxide, 2.4 g of triethylamine, 33.3 g of tetraethyl orthosilicate, 0.05 g of aqueous ammonia (in a concentration of 20 wt %) and 26 g of water. A magnetic stirring bar with heating and stirring functions was placed in the baker. The mixture was stirred at 65° C. for 3 hours. Water was supplemented to the mixture, if necessary. An alkaline hydrolysis solution was obtained.

(2) The resulting hydrolyzation solution was kept by standing at 26° C. for 9 hours to produce an aged product.

(3) To the aged product, was added slowly under stirring 9.6 g of carbon white powder. The resulting mixture was stirred for 1 hour to form a viscous substance, which was transferred to a close stainless steel reaction vessel, and crystallized at a constant temperature of 165° C. for 2 days. After filtering the resulting mixture, the filter cake was washed, dried at 120° C. for 24 hours, calcined at 550° C. for 6 hours to produce a TS-1 molecular sieve product TS-1 F9, which had a micropore volume of 0.146 mL/g, and a mesopore volume of 0.374 mL/g.

XRD confirmed that the molecular sieve had the similar characteristic peaks as those in FIG. 6 and FIG. 7, which demonstrated that the molecular sieve had a MFI structure.

(4) 6 g of the TS-1 molecular sieve product TS-1 F9 and 40 g of an aqueous TPAOH solution (in a concentration of 22.05 wt %) were mixed and stirred homogeneously. The resulting mixture was crystallized at 150° C. in a close reaction vessel for 3 days. After filtering the resulting mixture, the filter cake was washed, dried at 120° C. for 24 hours, calcined at 550° C. for 6 hours to produce the recrystallized TS-1 molecular sieve product TS-1 P9, which had a micropore volume of 0.149 mL/g, and a mesopore volume of 0.380 mL/g XRD confirmed that the molecular sieve had the similar characteristic peaks as those in FIG. 6 and FIG. 7, which demonstrated that the molecular sieve had a MFI structure.

The transmission electron microscope (TEM) photo showed that the molecular sieve had a hollow structure.

Examples 26-29

Titanium silicalite molecular sieves were prepared according to Example 23. The material, the operation condition and the analysis result for these examples were shown in Tables 1-3. See Example 23 for other conditions.

Example 30

Titanium silicalite molecular sieve was prepared according to Example 23, except that no inorganic amine source was added. The material, the operation condition and the analysis result for this example were shown in Tables 1-3. See Example 23 for other conditions.

Example 31

Titanium silicalite molecular sieve was prepared according to Example 23, except that in the step (3), the crystallization is conducted at 120° C. for 1 day and then at 170° C. for 2 days. The material, the operation condition and the analysis result for this example were shown in Tables 1-3. See Example 23 for other conditions.

Example 32

Titanium silicalite molecular sieve was prepared according to Example 23 (MEL molecular sieve), except for the material proportion and the template agent. The used template agent was tetrabutylammonium hydroxide (TBAOH). The material and the operation condition for this example were shown in Tables 1-2.

Example 33

Titanium silicalite molecular sieve was prepared according to Example 1 (BEA molecular sieve), except for the material proportion and the template agent. The used template agent was tetraethylammonium hydroxide (TEAOH). The material and the operation condition for this example were shown in Tables 1-2

Figure 10:
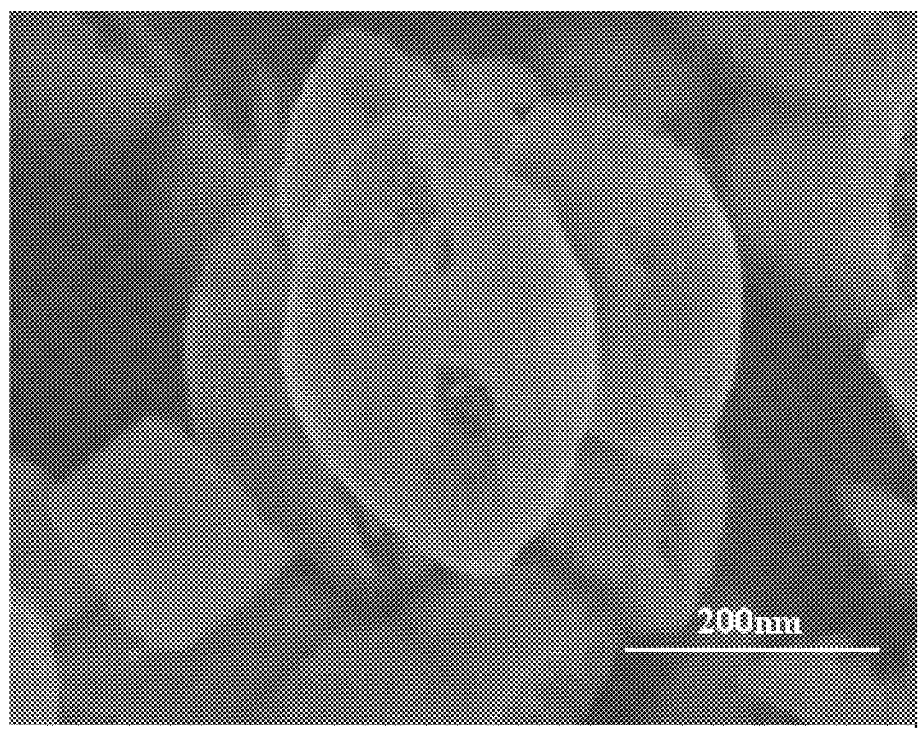
FIG. 10 is a SEM photo of the BEA-structured titanium silicalite molecular sieve.
Figure 11:
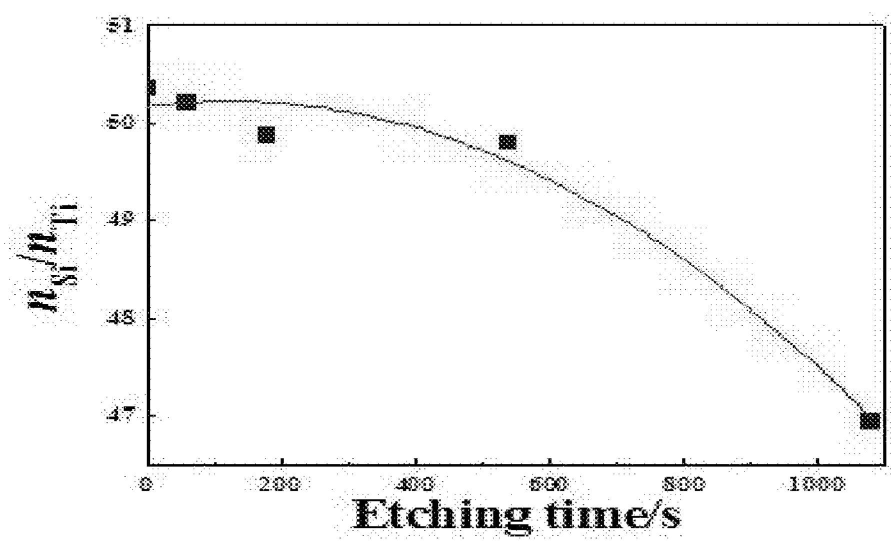
FIG. 11 is an etching curve for the titanium silicalite molecular sieve.

The SEM photo was shown in FIG. 10.

Comparative Example 7

Titanium silicalite molecular sieve was prepared according to Example 23, except that the aging was not conducted. The material, the operation condition and the analysis result for this example were shown in Tables 1-3. See Example 23 for other conditions.

Comparative Example 8

Titanium silicalite molecular sieves were prepared according to Example 23, except that the aging temperature was 75° C. The material, the operation condition and the analysis result for this example were shown in Tables 1-3. See Example 23 for other conditions.

Comparative Example 9

Titanium silicalite molecular sieves were prepared according to Example 23, except that the solid silicon source was added in the step (1). The material, the operation condition and the analysis result for this example were shown in Tables 1-3. See Example 23 for other conditions.

Comparative Example 10

The preparation of the conventional titanium silicalite molecular sieve (Zeolites, 1992, Vol. 12 page 943-950). 22.5 g of tetraethyl orthosilicate and 7.0 g of tetrapropylammonium hydroxide were mixed. To the resulting mixture was added 59.8 g of deionized water. The resulting mixture was mixed homogeneously, and then hydrolyzed at 60° C. for 1.0 hour to obtain a hydrolysis solution of tetraethyl orthosilicate. Under the violent stirring, to the above solution was added slowly and dropwise a solution composed of 1.1 g of tetrabutyl titanate and 5.0 g of isopropyl alcohol. The mixture was stirred at 75° C. for 3 hours to produce a clear colloid, which was transferred to a close stainless steel reaction vessel and crystallized at a constant temperature of 170° C. for 3 days to produce a TS-1 molecular sieve.

Comparative Example 11

The preparation of the HTS molecular sieve according to CN1102442C.

22.5 g of tetraethyl orthosilicate and 9.0 g of tetrapropylammonium hydroxide were mixed. To the resulting mixture was added 64.5 g of deionized water. The resulting mixture was mixed homogeneously, and then hydrolyzed at 60° C. for 1.0 hour to obtain a hydrolysis solution of tetraethyl orthosilicate. Under the violent stirring, to the above solution was added slowly and dropwise a solution composed of 0.6 g of tetrabutyl titanate and 7.0 g of isopropyl alcohol. The mixture was stirred at 75° C. for 7 hours to produce a clear colloid, which was transferred to a close stainless steel reaction vessel and crystallized at a constant temperature of 170° C. for 3 days to produce a TS-1 molecular sieve.

Tetrabutyl titanate, anhydrous isopropyl alcohol, tetrapropylammonium hydroxide and deionized water were mixed homogeneously in a molar ratio of 1:15:2.4:350. The resulting mixture was hydrolyzed at normal pressure at 45° C. for 30 minutes to produce a hydrolysis solution of tetrabutyl titanate. The above TS-1 molecular sieve and the hydrolysis solution of tetrabutyl titanate were mixed homogeneously in a ratio of molecular sieve (g):Ti(mol)=600:1. The mixture was stirred at normal temperature for 12 hours, then transferred to a stainless steel reaction vessel and kept at 165° C. for 3 days to produce the HTS molecular sieve.

The measurement of the molecular sieve surface Si/Ti ratio with the XPS etching method The Ti—Si molecular sieve sample obtained in Example 1 was subjected to the XPS etching (the depth >10 nm). Along with the time, the obtained Si/Ti ratio by atom decreased gradually "in a pattern of a quadratic function curve with a downward opening", as shown in FIG. 13.

The titanium silicalite molecular sieve samples obtained in Examples 2-33 was subjected to the XPS etching (the depth >10 nm). Along with the time, the obtained Si/Ti ratio by atom decreased gradually "in a pattern of a quadratic function curve with a downward opening".

Assays

The following assay illustrated the effect of the samples from Examples and Comparative Examples in the production of dihydroxybenzene from phenol by oxidation-hydroxylation and in the production of cyclohexanone oxime from cyclohexanone by oxamidination The used agents were commercially available and analytically pure. The concentrations before and after the reaction were measured by gas chromatography (GC, Agilent, 6890 Model, FFAP column).

Phenol conversion, cyclohexanone conversion, and cyclohexanone oxime selectivity are calculated according to the following equations:

$$\text{Phenol conversion \%} = \left(1 - \frac{\text{Residual phenol moles after reaction}}{\text{Added phenol moles before reaction}}\right) \times 100\%$$

$$\text{Cyclohexanone conversion \%} = \left(1 - \frac{\text{Residual cyclohexanone moles after reaction}}{\text{Added cyclohexanone moles before reaction}}\right) \times 100\%$$

-continued $$\text{Cyclohexanone oxime selectivity \%} = \frac{\text{Moles of formed cyclohexanoneoxime}}{\text{Moles of converted cyclohexanone}} \times 100\%$$

A sample from each of Examples and Comparative Examples), 1.25 g, was added to a three-neck flask containing 25 g of phenol and 20 ml of acetone. After the temperature was stable at the set value, 9.81 g of H2O2 solution (in a concentration of 30 wt %), (molar ratio of phenol:H2O2 being 3). The reaction was conducted at 80° C. under normal pressure (0.1 MPa) for 2 hours (phenol was converted by hydroxylation to dihydroxybenzene). Then the sample was collected.

Each of samples from Examples and Comparative Examples were mixed with t-butanol and 25 wt % aqueous ammonia in a weight ratio of molecular sieve:t-butanol: aqueous ammonia=1:7.5:7.5 in a slurry bed. The temperature was raised to 75° C. Then, under that temperature, 30 wt % H2O2 solution, a mixture of cyclohexanone and t-butanol (cyclohexanone:t-butanol=1:2.5 v/v) and 25 wt % aqueous ammonia were added simultaneously at rates of 6 mL/h, 8.6 mL/h and 6 mL/h And three streams were taken from the reactor at the corresponding rates.

The catalyst loadings and LHSV (liquid hourly space velocity) for Examples 1-9 and Comparative Examples 1-3 and 10-11 were 3.2 g, and 6.4 $h^{-1}$ respectively.

The catalyst loadings and LHSV (liquid hourly space velocity) for Examples 12-20 and Comparative Examples 4-6 were 3 g, and 6.9 $h^{-1}$ respectively.

The catalyst loadings and LHSV (liquid hourly space velocity) for Examples 23-31 and Comparative Examples 7-9 were 2.6 g, and 7.92 $h^{-1}$ respectively.

After the reaction was stable, the samples were subjected to GC analysis, and the result was shown in Table 3.

H2O2 Decomposition

Figure 12:
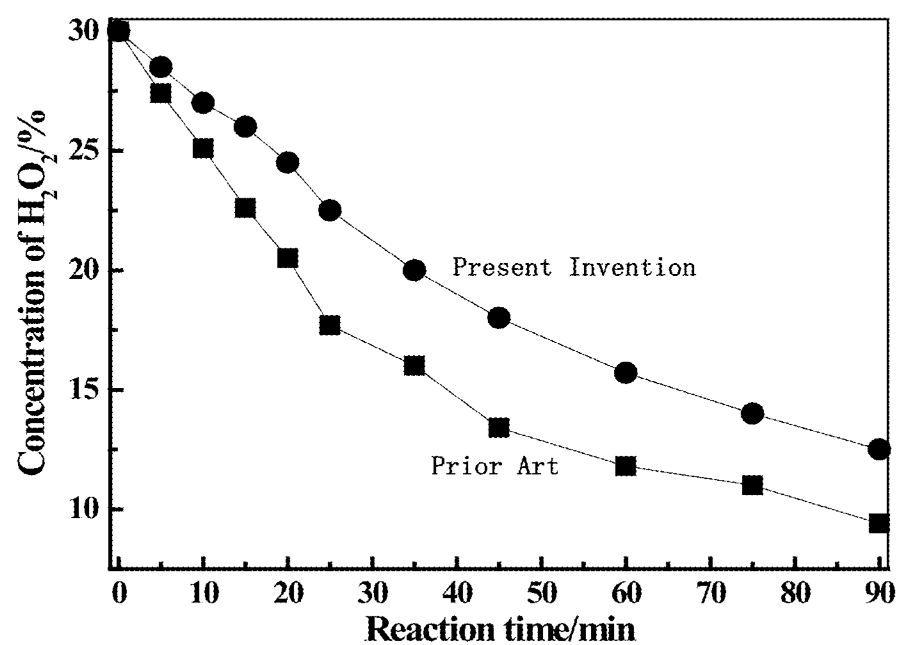
FIG. 12 is a time-concentration curve for H2O2 decomposition.

To 15 g of H2O2 solution (30 wt %) was added 2 g of titanium silicalite molecular sieve. The resulting mixture was stirred at 80° C. for 1 hour. The concentration of H2O2 solution was measured, and the result was shown in Table 3, and FIG. 12 (Ex 6 vs. Comp. Ex 11).

TABLE 1

| Ex. | Template agent/ Total Silicon Source | Solid silicon source/ Organic silicon source | Ti source/ Total Silicon Source | Inorganic amine source/ Ti source | water/ Total Silicon Source | Organic quaternary ammonium base | Organic quaternary ammonium base/Total Silicon Source | Organic quaternary ammonium salt | Organic quaternary ammonium salt/Total Silicon Source | Organic amine | Organic amine/ Total Silicon Source | Long-chain alkyl ammonium | Long-chain alkyl ammonium/ Total Silicon Source |
|---|---|---|---|---|---|---|---|---|---|---|---|---|---|
| 1 | 0.092 | 3.9 | 0.03 | 3.92 | 13.8 | TPAOH | | | | | | | |
| 2 | 0.05 | 8 | 0.02 | 2.2 | 6 | TPAOH | | | | | | | |
| 3 | 0.2 | 1 | 0.01 | 0.056 | 10 | | | TPABr | 0.041 | triethylamine | 0.159 | | |
| 4 | 0.2 | 9 | 0.025 | 0.1 | 20 | TPAOH | | | | | | | |
| 5 | 0.051 | 1 | 0.03 | 0.05 | 8 | TPAOH | | | | | | | |
| 6 | 0.12 | 3 | 0.035 | 0.01 | 9 | TPAOH | | | | | | | |
| 7 | 0.24 | 6 | 0.04 | 0.5 | 15 | TPAOH | | | | | | | |
| 8 | 0.092 | 3.9 | 0.03 | 0 | 13.8 | TPAOH | | | | | | | |
| 9 | 0.08 | 3.9 | 0.02 | 3.92 | 36.8 | TPAOH | | | | | | | |
| 10 | 0.22 | 2 | 0.03 | 0.03 | 10 | TBAOH | | | | | | | |
| 11 | 0.22 | 2 | 0.04 | 0.03 | 10 | TEAOH | | | | | | | |
| C1 | 0.092 | 3.9 | 0.03 | 0 | 13.8 | TPAOH | | | | | | | |
| C2 | 0.092 | 3.9 | 0.03 | 0 | 13.8 | TPAOH | | | | | | | |
| C3 | 0.092 | 3.9 | 0.03 | 3.92 | 13.8 | TPAOH | | | | | | | |
| 12 | 0.292 | 3.9 | 0.03 | 3.92 | 13.8 | | | TPABr | 0.092 | ethylene diamine | 0.2 | | |

TABLE 1-continued

| Ex. | Template agent/Total Silicon Source | Solid silicon source/Organic silicon source | Ti source/Total Silicon Source | Inorganic amine source/Ti source | water/Total Silicon Source | Organic quaternary ammonium base | Organic quaternary ammonium base/Total Silicon Source | Organic quaternary ammonium salt | Organic quaternary ammonium salt/Total Silicon Source | Organic amine | Organic amine/Total Silicon Source | Long-chain alkyl ammonium | Long-chain alkyl ammonium/Total Silicon Source |
|---|---|---|---|---|---|---|---|---|---|---|---|---|---|
| 13 | 0.1 | 8 | 0.02 | 0.05 | 6 | | | TPABr | 0.05 | ethylene diamine | 0.05 | | |
| 14 | 0.28 | 1 | 0.01 | 2.2 | 10 | | | TPABr | 0.2 | triethyl-amine | 0.08 | | |
| 15 | 0.55 | 9 | 0.025 | 0.1 | 20 | | | TPACl | 0.45 | ethylene diamine | 0.1 | | |
| 16 | 0.5 | 1 | 0.03 | 0.05 | 8 | | | TPABr | 0.35 | ethylene diamine | 0.15 | | |
| 17 | 0.4 | 3 | 0.035 | 0.01 | 9 | | | TPABr | 0.15 | ethylene diamine | 0.25 | | |
| 18 | 0.4 | 6 | 0.04 | 0.5 | 15 | | | TPABr | 0.1 | ethylene diamine | 0.3 | | |
| 19 | 0.292 | 3.9 | 0.03 | 0 | 13.8 | | | TPABr | 0.092 | ethylene diamine | 0.2 | | |
| 20 | 0.28 | 3.9 | 0.02 | 3.92 | 36.8 | | | TPABr | 0.2 | triethyl-amine | 0.08 | | |
| 21 | 0.32 | 2 | 0.03 | 0.03 | 10 | | | TBABr | 0.22 | ethylene diamine | 0.1 | | |
| 22 | 0.32 | 2 | 0.04 | 0.03 | 10 | | | TEABr | 0.22 | ethylene diamine | 0.1 | | |
| C4 | 3.08 | 3.9 | 0.025 | 0 | 36.8 | | | TPABr | 0.092 | ethylene diamine | 0.2 | | |
| C5 | 3.08 | 3.9 | 0.03 | 0 | 36.8 | | | TPABr | 0.092 | ethylene diamine | 0.2 | | |
| C6 | 3.08 | 3.9 | 0.035 | 3.92 | 36.8 | | | TPABr | 0.092 | ethylene diamine | 0.2 | | |
| 23 | 0.185 | 3.9 | 0.03 | 3.92 | 13.8 | TPAOH | 0.092 | | | | | MSDS | 0.093 |
| 24 | 0.1 | 8 | 0.02 | 2.2 | 6 | TPAOH | 0.05 | | | | | CTMAB | 0.05 |
| 25 | 0.25 | 1 | 0.01 | 0.056 | 10 | | | TPABr | 0.126 | triethyl-amine | 0.074 | MSDS | 0.05 |
| 26 | 0.278 | 9 | 0.025 | 0.1 | 20 | TPAOH | 0.2 | | | | | MSDS | 0.078 |
| 27 | 0.24 | 1 | 0.03 | 0.05 | 8 | TPAOH | 0.051 | | | | | MSDS | 0.189 |
| 28 | 0.351 | 3 | 0.035 | 0.01 | 9 | TPAOH | 0.12 | | | | | MSDS | 0.231 |
| 29 | 0.28 | 6 | 0.04 | 0.5 | 15 | | | TPABr | 0.24 | | | MSDS | 0.04 |
| 30 | 0.185 | 3.9 | 0.03 | 0 | 13.8 | TPAOH | 0.092 | | | | | MSDS | 0.093 |
| 31 | 0.48 | 3.9 | 0.02 | 3.92 | 36.8 | TPAOH | 0.08 | | | | | MSDS | 0.4 |
| 32 | 0.46 | 2 | 0.03 | 0.03 | 10 | TBAOH | 0.22 | | | | | MSDS | 0.24 |
| 33 | 0.54 | 2 | 0.04 | 0.03 | 10 | TEAOH | 0.22 | | | | | MSDS | 0.32 |
| C7 | 0.092 | 3.9 | 0.03 | 0 | 13.8 | TPAOH | 0.092 | | | | | MSDS | 0.093 |
| C8 | 0.092 | 3.9 | 0.03 | 0 | 13.8 | TPAOH | 0.092 | | | | | MSDS | 0.093 |
| C9 | 0.092 | 3.9 | 0.03 | 3.92 | 13.8 | TPAOH | 0.092 | | | | | MSDS | 0.093 |

TABLE 2

| Ex. | Step (1) Stirring Temperature/ ° C. | Step (1) Stirring Time/ h | Step (2) Aging temperature/ ° C. | Step (2) Aging Time/ h | Step (3) Crystallization Temperature ° C. | Step (3) Crystallization Time Hours | Step (3) Product crystal grain Surface Si/Ti ratio/bulk Si/Ti ratio | Step (3) Product Framework Ti/Si ratio (as atom molar ratio) | Step (4) Product surface Si/Ti ratio/ bulk Si/ Ti ratio |
|---|---|---|---|---|---|---|---|---|---|
| 1 | 80 | 4 | 26 | 12 | 165 | 48 | 1.52 | 0.025 | 1.56 |
| 2 | 90 | 1 | 26 | 3 | 145 | 144 | 2.78 | | 2.85 |
| 3 | 65 | 3 | 26 | 9 | 165 | 48 | 1.96 | | 2.01 |
| 4 | 50 | 8 | 26 | 15 | 160 | 24 | 2.68 | | 2.75 |
| 5 | 80 | 4 | 26 | 35 | 165 | 72 | 1.87 | | 1.92 |
| 6 | 75 | 4 | 26 | 12 | 170 | 48 | 1.58 | | 1.62 |
| 7 | 75 | 4 | 26 | 12 | 170 | 48 | 3.16 | | 3.24 |
| 8 | 80 | 4 | 26 | 12 | 165 | 48 | 1.75 | 0.0203 | 2.34 |
| 9 | 80 | 4 | 26 | 12 | | | 1.67 | | 1.71 |
| 10 | 80 | 4 | 30 | 3 | 170 | 36 | 2.69 | | 2.76 |
| 11 | 80 | 4 | 30 | 13 | 170 | 36 | 1.95 | | 2 |
| C10 | | | | | | | 1.02 | | 1.05 |
| C11 | | | | | | | 0.95 | | 0.97 |
| C1 | 80 | 4 | 0 | 0 | 165 | 48 | 0.98 | | 0.99 |
| C2 | 80 | 4 | 75 | 12 | 165 | 48 | 0.98 | | 1 |
| C3 | 80 | 4 | 0 | 0 | 165 | 48 | 1.06 | | 1.09 |
| 12 | 80 | 4 | 26 | 12 | 165 | 48 | 1.51 | 0.0248 | 1.55 |
| 13 | 90 | 1 | 26 | 3 | 145 | 144 | 2.58 | | 2.69 |

TABLE 2-continued

| Ex. | Step (1) Stirring Temperature/ ° C. | Step (1) Stirring Time/ h | Step (2) Aging temperature/ ° C. | Step (2) Aging Time/ h | Step (3) Crystallization Temperature ° C. | Step (3) Crystallization Time Hours | Step (3) Product crystal grain Surface Si/ Ti ratio/bulk Si/Ti ratio | Step (3) Product Framework Ti/Si ratio (as atom molar ratio) | Step (4) Product surface Si/ Ti ratio/ bulk Si/ Ti ratio |
|---|---|---|---|---|---|---|---|---|---|
| 14 | 65 | 3 | 26 | 9 | 165 | 48 | 2.01 | | 2.03 |
| 15 | 50 | 8 | 26 | 15 | 160 | 24 | 2.88 | | 2.9 |
| 16 | 80 | 4 | 26 | 35 | 165 | 72 | 2.15 | | 2.17 |
| 17 | 75 | 4 | 26 | 12 | 170 | 48 | 1.39 | | 1.44 |
| 18 | 75 | 4 | 26 | 12 | 170 | 48 | 3.45 | | 3.46 |
| 19 | 80 | 4 | 26 | 12 | 165 | 48 | 2.12 | 0.021 | 2.16 |
| 20 | 80 | 4 | 26 | 12 | | | 1.35 | | 1.38 |
| 21 | 80 | 4 | 30 | 3 | 170 | 36 | 2.97 | | 3.04 |
| 22 | 80 | 4 | 30 | 13 | 170 | 36 | 2.09 | | 2.1 |
| C4 | 80 | 4 | 0 | 0 | 165 | 48 | 0.98 | | 9.98 |
| C5 | 80 | 4 | 75 | 12 | 165 | 48 | 0.95 | | 0.94 |
| C6 | 80 | 4 | 0 | 0 | 165 | 48 | 1..01 | | 0.95 |
| 23 | 80 | 4 | 26 | 12 | 165 | 48 | 1.73 | 0.0241 | 1.85 |
| 24 | 90 | 1 | 26 | 3 | 145 | 144 | 3.04 | | 3.05 |
| 25 | 65 | 3 | 26 | 9 | 165 | 48 | 1.72 | | 1.83 |
| 26 | 50 | 8 | 26 | 15 | 160 | 24 | 2.47 | | 2.57 |
| 27 | 80 | 4 | 26 | 35 | 165 | 72 | 1.58 | | 1.63 |
| 28 | 75 | 4 | 26 | 12 | 170 | 48 | 1.83 | | 1.83 |
| 29 | 75 | 4 | 26 | 12 | 170 | 48 | 3.19 | | 3.27 |
| 30 | 80 | 4 | 26 | 12 | 165 | 48 | 2.22 | 0.0213 | 2.32 |
| 31 | 80 | 4 | 26 | 12 | | | 1.87 | | 2 |
| 32 | 80 | 4 | 30 | 3 | 170 | 36 | 2.77 | | 2.86 |
| 33 | 80 | 4 | 30 | 13 | 170 | 36 | 2.02 | | 2.07 |
| C7 | 80 | 4 | 0 | 0 | 165 | 48 | 0.99 | | 9.96 |
| C8 | 80 | 4 | 75 | 12 | 165 | 48 | 0.98 | | 0.97 |
| C9 | 80 | 4 | 0 | 0 | 165 | 48 | 1..0 | 0.97 | 0.97 |

TABLE 3

| Molecular sieve From Ex. | H2O2 Decomposition H2O2 concentration wt % | Step (3) Product, Phenol conversion % | Step (3) Product cyclohexanone oxamidination, conversion, % | Step (3) Product, cyclohexanone oxamidination, selectivity, % | Step (4) Product, cyclohexanone oxamidination, conversion, % | Step (4) Product, cyclohexanone oxamidination, selectivity, % | Step (3) Product, micropore volume, mL/g | Step (3) Product, mesopore volume, mL/g | Step (4) Product, micropore volume, mL/g | Step (4) Product, mesopore volume, mL/g |
|---|---|---|---|---|---|---|---|---|---|---|
| 1 | 18.24 | 25.24 | 96.23 | 98.18 | 98.46 | 98.43 | | | | |
| 2 | 16.73 | 24.53 | 97.71 | 99.29 | 99.18 | 99.54 | | | | |
| 3 | 18.36 | 24.36 | 98.12 | 97.88 | 99.59 | 98.12 | | | | |
| 4 | 19.01 | 24.73 | 98.68 | 99.32 | 99.15 | 99.57 | | | | |
| 5 | 19.1 | 24.37 | 96.33 | 98.67 | 97.77 | 98.92 | | | | |
| 6 | 17.44 | 25.21 | 97.28 | 94.72 | 97.72 | 94.96 | | | | |
| 7 | 19.23 | 23.13 | 94.38 | 96.62 | 95.8 | 96.86 | | | | |
| 8 | 17.95 | 21.86 | 92.73 | 97.67 | 94.12 | 99.15 | | | | |
| 9 | 18.43 | 23.78 | 96.47 | 99.53 | 97.92 | 99.78 | | | | |
| 10 | | | | | | | | | | |
| 11 | | | | | | | | | | |
| C10 | 13.21 | 16.63 | 83.28 | 89.72 | | | | | | |
| C11 | 12.89 | 18.28 | | | 92.64 | 90.98 | | | | |
| C1 | 14.56 | 17.25 | 84.56 | 88.78 | 85.83 | 89 | | | | |
| C2 | 13.68 | 18.1 | 85.31 | 90.25 | 86.59 | 90.48 | | | | |
| C3 | 14.97 | 16.48 | 83.78 | 91.36 | 85.04 | 91.59 | | | | |
| 12 | 18.17 | 25.27 | 97.12 | 97.4 | 97.61 | 97.61 | | | | |
| 13 | 16.74 | 24.55 | 96.9 | 98.43 | 98.39 | 98.75 | | | | |
| 14 | 18.36 | 24.36 | 97.34 | 97.1 | 98.79 | 97.34 | | | | |
| 15 | 18.96 | 24.82 | 97.84 | 98.44 | 98.42 | 98.8 | | | | |
| 16 | 19.2 | 24.37 | 95.53 | 97.79 | 96.93 | 98.21 | | | | |
| 17 | 17.43 | 25.21 | 95.4 | 94.05 | 96.98 | 94.12 | | | | |
| 18 | 19.3 | 23.18 | 93.68 | 95.83 | 95.08 | 96.11 | | | | |
| 19 | 17.97 | 21.95 | 91.97 | 99.16 | 93.28 | 98.38 | | | | |
| 20 | 18.37 | 23.87 | 95.69 | 98.67 | 97.2 | 98.93 | | | | |
| 21 | | | | | | | | | | |
| 22 | | | | | | | | | | |
| C4 | 14.48 | 17.28 | 83.86 | 88.07 | 85.16 | 88.36 | | | | |
| C5 | 13.59 | 18.17 | 84.53 | 89.48 | 86 | 89.74 | | | | |
| C6 | 15.05 | 16.51 | 83.17 | 90.64 | 84.28 | 90.78 | | | | |
| 23 | 18.31 | 25.17 | 98.01 | 98.01 | 99.52 | 97.8 | 0.17 | 0.336 | 0.162 | 0.376 |
| 24 | 16.75 | 24.57 | 96.78 | 99.15 | 97.29 | 98.82 | 0.158 | 0.369 | 0.15 | 0.413 |
| 25 | 18.37 | 24.36 | 96.19 | 97.73 | 97.73 | 97.49 | 0.166 | 0.334 | 0.158 | 0.374 |
| 26 | 19.04 | 24.71 | 98.81 | 99.2 | 98.94 | 99.83 | 0.157 | 0.352 | 0.149 | 0.394 |

TABLE 3-continued

| Molecular sieve From Ex. | H2O2 Decomposition H2O2 concentration wt % | Step (3) Product, Phenol conversion % | Step (3) Product cyclohexanone oxamidination, conversion, % | Step (3) Product, cyclohexanone oxamidination, selectivity, % | Step (4) Product, cyclohexanone oxamidination, conversion, % | Step (4) Product, cyclohexanone oxamidination, selectivity, % | Step (3) Product, micropore volume, mL/g | Step (3) Product, mesopore volume, mL/g | Step (4) Product, micropore volume, mL/g | Step (4) Product, mesopore volume, mL/g |
|---|---|---|---|---|---|---|---|---|---|---|
| 27 | 19.09 | 24.33 | 97.32 | 96.6 | 97.91 | 98.19 | 0.167 | 0.348 | 0.159 | 0.39 |
| 28 | 17.35 | 25.21 | 97.37 | 94.5 | 98.79 | 94.93 | 0.168 | 0.337 | 0.16 | 0.377 |
| 29 | 19.2 | 23.13 | 95.47 | 96.5 | 96.06 | 96.81 | 0.156 | 0.346 | 0.148 | 0.388 |
| 30 | 18 | 21.92 | 91.65 | 98.77 | 92.34 | 99.56 | 0.16 | 0.355 | 0.152 | 0.392 |
| 31 | 18.46 | 25.82 | 98.59 | 99.33 | 99.07 | 99.87 | 0.161 | 0.329 | 0.153 | 0.366 |
| 32 | | | | | | | | | | |
| 33 | | | | | | | | | | |
| C7 | 14.59 | 17.22 | 84.2 | 88.42 | 85.51 | 88.71 | 0.167 | 0.318 | 0.159 | 0.356 |
| C8 | 13.67 | 18.03 | 84.87 | 89.84 | 86.34 | 90.1 | 0.162 | 0.322 | 0.154 | 0.361 |
| C9 | 14.98 | 16.53 | 83.5 | 91 | 84.62 | 91.14 | 0.163 | 0.334 | 0.155 | 0.374 |

We claim:

1. A titanium silicalite molecular sieve, wherein a crystal grain of the titanium silicalite molecular sieve has a ratio of (surface Si/Ti ratio):(bulk Si/Ti ratio) being larger than 1.1 and less than 5, wherein the titanium silicalite molecular sieve has a micropore structure with a pore diameter less than 1 nm and a mesopore structure with a pore diameter of 2-8 nm, a volume of pores having a pore diameter of 2-8 nm is 0.3-0.8 mL/g, a volume of pores having a pore diameter being less than 1 nm is 0.12-0.19 mL/g.

2. A titanium silicalite molecular sieve, wherein a crystal grain of the titanium silicalite molecular sieve has a ratio of (surface Si/Ti ratio):(bulk Si/Ti ratio) larger than 1.1 and less than 5, wherein the crystal grain of the titanium silicalite molecular sieve has a hollow structure and a diameter of a hollow portion of the hollow crystal grain is 5-300 nm.

3. The titanium silicalite molecular sieve of claim 2, wherein the titanium silicalite molecular sieve is a TS-1 molecular sieve, a TS-2 molecular sieve, or a Ti-β molecular sieve.

4. The titanium silicalite molecular sieve of claim 2, wherein the ratio of (surface Si/Ti ratio):(bulk Si/Ti ratio) is (1.2-4):1.

5. The titanium silicalite molecular sieve of claim 2, wherein the titanium silicalite molecular sieve has a Ti/Si molar ratio of (0.005-0.03):1.

6. The titanium silicalite molecular sieve of claim 2, wherein the titanium silicalite molecular sieve has a Ti/Si molar ratio of (0.01-0.025):1.

7. The titanium silicalite molecular sieve of claim 2, having an adsorption capacity of benzene measured under the conditions of 25° C., P/P0=0.10, and 1 hour of adsorption time of at least 70 mg/g.

8. The titanium silicalite molecular sieve of claim 2, wherein the Si/Ti ratio by atom decreases in a direction from the surface to the interior of the titanium silicalite molecular sieve.

9. A process for synthesizing a titanium silicalite molecular sieve of claim 2, comprising the following steps of:

(1) a titanium source, a template agent, an organic silicon source, water and an optional inorganic amine source are mixed and subjected to hydrolyzation and removing alcohols;

(2) the product obtained in the step (1) is aged at 15-50° C.;

(3) the aged product obtained in the step (2) and a solid silicon source are mixed homogeneously, then subjected to crystallization in a close reaction vessel, and the titanium silicalite molecular sieve is collected.

10. The process of claim 9, wherein the titanium source is an organic titanium source and/or an inorganic titanium source;

the template agent is one or more of an organic quaternary ammonium base, an organic amine, an organic quaternary ammonium salt, and an long-chain alkyl ammonium compound, wherein the molar ratio of the organic quaternary ammonium base to the total silicon source is zero or (0.05-0.36):1; the molar ratio of the organic amine to the total silicon source is (0-0.45):1; the molar ratio of the organic quaternary ammonium salt to the total silicon source is (0-0.45):1; and the molar ratio of the long-chain alkyl ammonium compound to the total silicon source is zero or (0.04-0.45):1;

the organic silicon source is an organic silicate, which has a general formula of $Si(OR^1)_4$, $R^1$ is a linear or branched $C_1$-$C_6$alkyl;

the solid silicon source is a high purity silica particle or powder, on a dry basis and by weight, the solid silicon source has a $SiO_2$ content of more than 99.99 wt %, and a total content by atom of Fe, Al and Na of less than 10 ppm;

the inorganic amine source is an inorganic ammonium salt and/or aqueous ammonia.

11. The process of claim 9, wherein the molar ratio of the titanium source (as TiO2) to the total silicon source (as $SiO_2$) is (0.005-0.05):1;

the molar ratio of the template agent to the total silicon source (as $SiO_2$) is (0.05-0.6):1;

the molar ratio of water to the total silicon source (as $SiO_2$) is (5-100):1;

the molar ratio of the inorganic amine source (as $NH_4^+$) to the titanium source (as TiO2) is (0-5):1; and the weight ratio of the aged product (as $SiO_2$):the solid silicon source (as $SiO_2$) is 1:(0.1-10).

12. The process of claim 9, wherein the aging in the step (2) is conducted by keeping the product by standing at 15-50° C. for 1-60 hours.

13. The process of claim 9, wherein in the step (3), the crystallization temperature is 110° C. to 200° C.;

the crystallization pressure is an autogenous pressure; the crystallization time is 2 hours to 20 days.

14. The process of claim 9, wherein in the step (1), the template agent comprises an organic quaternary ammonium base and/or an organic amine, and optionally an organic quaternary ammonium salt.

15. The process of claim 9, wherein in the step (1), the template agent comprises an organic quaternary ammonium base and/or an organic amine, and optionally an organic quaternary ammonium salt, wherein the molar ratio of the organic quaternary ammonium base to the organic amine is 1:(0-10), and the molar ratio of the organic quaternary ammonium base to the organic quaternary ammonium salt is 1:(0-10).

16. The process of claim 9, wherein in the step (1), the template agent comprises an organic quaternary ammonium salt and an organic base.

17. The process of claim 9, wherein in the step (1), the template agent comprises an organic quaternary ammonium salt and an organic base, wherein the molar ratio of the organic quaternary ammonium salt to the total silicon source is (0.04-0.55):1, the molar ratio of the organic quaternary ammonium base to the organic quaternary ammonium salt is (0.04-0.45):1, and the molar ratio of the inorganic amine source (as $NR_4^+$) to the titanium source (as TiO2) is (0-0.5):1.

18. The process of claim 9, wherein in the step (1), the template agent comprises an organic quaternary ammonium base and/or an organic quaternary ammonium salt, an optional organic amine, and a long-chain alkyl ammonium compound.

19. The process of claim 9, wherein in the step (1), the template agent comprises an organic quaternary ammonium base and/or an organic quaternary ammonium salt, an optional organic amine, and a long-chain alkyl ammonium compound, wherein the molar ratio of (the organic quaternary ammonium base and the organic quaternary ammonium salt) to the total silicon source is (0.04-0.45):1, and the molar ratio of the long-chain alkyl ammonium compound and the total silicon source is (0.04-0.45):1.

20. The process of claim 9, wherein the template agent is selected from the group consisting of:

(1) an organic quaternary ammonium base and optionally a long-chain alkyl ammonium compound;

(2) an organic quaternary ammonium salt, an organic amine and optionally a long-chain alkyl ammonium compound;

(3) an organic quaternary ammonium salt and a long-chain alkyl ammonium compound.

21. The process of claim 9, wherein the titanium silicalite molecular sieve is a TS-1 molecular sieve, wherein the template agent is one or more of tetrapropylammonium hydroxide, tetrapropylammonium chloride and tetrapropylammonium bromide, and optionally an organic amine and/or a long-chain alkyl ammonium compound; or, the titanium silicalite molecular sieve is a TS-2 molecular sieve, wherein the template agent is one or more of tetrabutylammonium hydroxide, tetrabutylammonium chloride and tetrabutylammonium bromide, and optionally an organic amine and/or a long-chain alkyl ammonium compound; or, the titanium silicalite molecular sieve is a Ti-β molecular sieve, wherein the template agent is one or more of tetraethylammonium hydroxide, tetraethylammonium chloride and tetraethylammonium bromide, and optionally an organic amine and/or a long-chain alkyl ammonium compound.

22. The process of claim 9, wherein said process further comprises a step (4): the titanium silicalite molecular sieve obtained in the step (3) is subjected to crystallization in an organic base solution, and then the titanium silicalite molecular sieve is collected, the crystallization temperature is 120° C. to 200° C., the crystallization time is 1 day to 6 days, in the step (4), the molar ratio of the titanium silicalite molecular sieve to the organic base is 1:(0.02-0.5), the molar ratio of the titanium silicalite molecular sieve to water is 1:(2-50).

23. The process of claim 9, wherein the titanium source is one or more of tetraalkyl titanate ($Ti(alkoxy)_4$), $TiCl_4$, $Ti(SO_4)_2$ and hydrolysates thereof, wherein the alkyl group in tetraalkyl titanate contains 1-6 carbon atoms.

24. The process of claim 9, wherein the solid silicon source is carbon white having a specific surface area of 50-400 $m^2/g$.

25. The process of claim 9, wherein the molar ratio of the titanium source (as $TiO_2$) to the total silicon source (as $SiO_2$)=(0.005-0.040):1.

26. The process of claim 9, wherein the molar ratio of the template agent to the total silicon source (as $SiO_2$)=(0.05-0.5):1.

27. The process of claim 9, wherein the molar ratio of water to the total silicon source (as $SiO_2$) is (5-50):1.

28. The process of claim 9, wherein the molar ratio of the inorganic amine source (as $NR_4^+$) to the titanium source (as $TiO_2$) is (0.01-4):1.

29. The process of claim 9, wherein the molar ratio of the inorganic amine source (as $NH_4^+$) to the total silicon source (as $SiO_2$) is (0.01-0.05):1.

30. The process of claim 9, wherein the weight ratio of the aged product (as $SiO_2$) to the solid silicon source (as $SiO_2$) is 1:(1-9).

31. The process of claim 9, wherein the organic quaternary ammonium base is one or more of tetrapropylammonium hydroxide (TPAOH), tetrabutylammonium hydroxide (TBAOH) and tetraethylammonium hydroxide (TEAOH);

the organic amine is one or more of aliphatic amine, aromatic amine and alcoholic amine;

the aliphatic amine has a general formula of $R^3(NH_2)_n$, wherein $R^3$ is $C_{1-4}$alkyl or $C_{1-4}$alkylene, n is 1 or 2;

the alcoholic amine has a general formula of $(HOR^4)_m NH_{(3-m)}$, wherein $R^4$ is $C_1$-$C_4$alkyl, m is 1, 2 or 3;

the aromatic amine is one or more of aniline, amino toluene and p-phenylene diamine;

the organic quaternary ammonium salt is one or more of tetrapropylammonium bromide, tetrabutylammonium bromide, tetraethylammonium bromide, tetrapropylammonium chloride, tetrabutylammonium chloride and tetraethylammonium chloride;

the long-chain alkyl ammonium compound has a formula of $R^5NH_3X$ or $R^5N(R^6)_3X$, wherein $R^5$ is $C_{12}$-$C_{18}$ alkyl, $R^6$ is $C_1$-$C_6$alkyl, wherein three $R^6$s in $R^5N(R^6)_3X$ are identical or not; and X is OH—, CI—, or Br.

32. The process of claim 9, wherein in the step (1), the time for hydrolyzation and removing alcohols is 2-30 hours.

33. The process of claim 9, wherein in the step (1), the time for hydrolyzation and removing alcohols is 2-30 hours;

in the step (1), the temperature for hydrolyzation and removing alcohols is 50-95° C.;

in the mixture obtained in the step (1), the weight content of alcohols produced by hydrolyzation of the organic silicon source and the titanium source is not higher than 10 ppm;

in the step (2), the aging time is 2 hours to 50 hours;

in the step (2), the aging temperature is 15° C. to 30° C.;

in the step (3), the crystallization is conducted under the following conditions: the crystallization is performed at 100° C. to 130° C. for 0.5 day to 1.5 days, and then at 160° C. to 180° C. for 1 day to 3 days, and the crystallization pressure is an autogenous pressure.

34. The process of claim 9, wherein the organic silicate is one or more of tetramethyl orthosilicate, tetraethyl orthosilicate, tetrabutyl orthosilicate and dimethyl diethyl orthosilicate.

35. The process of claim 9, wherein the molar ratio of the template agent to the total silicon source (as $SiO_2$)=(0.08-0.6):1.

* * * * *